United States Patent
Takeda et al.

(10) Patent No.: US 12,444,260 B2
(45) Date of Patent: Oct. 14, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Kanako Takeda, Tokyo (JP); Koichiro Wanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 17/849,508

(22) Filed: Jun. 24, 2022

(65) Prior Publication Data

US 2022/0415109 A1     Dec. 29, 2022

(30) Foreign Application Priority Data

Jun. 29, 2021 (JP) .................... 2021-107295

(51) Int. Cl.
*G07C 9/38* (2020.01)
*G06V 20/52* (2022.01)
*G06V 40/16* (2022.01)
*G07C 9/37* (2020.01)

(52) U.S. Cl.
CPC ............ *G07C 9/38* (2020.01); *G06V 20/52* (2022.01); *G06V 40/168* (2022.01); *G06V 40/172* (2022.01); *G07C 9/37* (2020.01)

(58) Field of Classification Search
CPC . G07C 9/38; G07C 9/37; G06V 20/52; G06V 40/168; G06V 40/172
See application file for complete search history.

(56) References Cited

U.S. PATENT DOCUMENTS

| | | | |
|---|---|---|---|
| 12,118,824 B2* | 10/2024 | Kamio | G06V 40/173 |
| 2002/0070858 A1* | 6/2002 | Gutta | G07C 9/37 340/541 |
| 2002/0094111 A1* | 7/2002 | Puchek | G07C 9/257 382/115 |
| 2016/0234232 A1* | 8/2016 | Poder | H04L 63/1416 |
| 2017/0039010 A1* | 2/2017 | Nobutani | G06F 3/1238 |
| 2018/0061158 A1* | 3/2018 | Greene | G06V 20/52 |
| 2019/0236377 A1* | 8/2019 | Otake | G06V 20/52 |
| 2023/0095529 A1* | 3/2023 | Akutsu | G06V 40/168 340/5.83 |

FOREIGN PATENT DOCUMENTS

| | | | |
|---|---|---|---|
| JP | 2017-215737 A | 12/2017 | |
| JP | 2020-169860 A | 10/2020 | |

* cited by examiner

*Primary Examiner* — Mohamed Barakat
(74) *Attorney, Agent, or Firm* — Canon U.S.A., Inc. IP Division

(57) ABSTRACT

There is provided a method including instructing a notification apparatus to issue a notification in a case where a video image capturing an entrance of a specific location includes an unregistered person moving toward the specific location, and deactivating the notification by the notification apparatus in a case where a video image capturing the specific location includes a pre-registered person.

9 Claims, 24 Drawing Sheets

FIG. 10

| PERSON WHO ACTUALLY PASSED | DETERMINATION RESULT FOR ENTRY VIDEO IMAGE | DETERMINATION TO CANCEL |
|---|---|---|
| REGISTERED PERSON | UNREGISTERED PERSON | PERFORMED |
| UNREGISTERED PERSON | UNREGISTERED PERSON | — |
| REGISTERED PERSON AND UNREGISTERED PERSON | UNREGISTERED PERSON AND UNREGISTERED PERSON | PERFORMED |

1001

| PERSON WHO ACTUALLY PASSED | DETERMINATION RESULT FOR EXIT VIDEO IMAGE | ENTRY RESULT |
|---|---|---|
| REGISTERED PERSON | UNREGISTERED PERSON | REGISTERED PERSON |
| UNREGISTERED PERSON | UNREGISTERED PERSON | UNREGISTERED PERSON |
| REGISTERED PERSON AND UNREGISTERED PERSON | UNREGISTERED PERSON AND UNREGISTERED PERSON | REGISTERED PERSON AND UNREGISTERED PERSON |

```
┌─────────────────────────────────────────────┐
│       JUN. 8, 2021 (LABORATORY A)           │~1400
├─────────────────────────────────────────────┤
│ ENTRY  10:57:30 A.M.  ●●                    │~1401
│ ENTRY  10:57:32 A.M.  UNREGISTERED PERSON   │
│ EXIT   11:07:10 A.M.  UNREGISTERED PERSON △ │~1402
│ ENTRY  11:08:12 A.M.  UNREGISTERED PERSON △ │
│ ENTRY  11:08:20 A.M.  UNREGISTERED PERSON △ │
│ ENTRY  11:08:21 A.M.  UNREGISTERED PERSON △ │
│ EXIT   11:08:30 A.M.  UNREGISTERED PERSON △ │
└─────────────────────────────────────────────┘
```

FIG.15

| FRAME NO. | ID = 1 | ID = 2 | ID = 3 | ID = 4 |
|---|---|---|---|---|
| 1 | | | | |
| 2 | REGISTERED PERSON A | | | | ~1501
| 3 | REGISTERED PERSON A | | | |
| 4 | REGISTERED PERSON A | UNREGISTERED PERSON | | | ~1502
| 5 | REGISTERED PERSON A | UNREGISTERED PERSON | | |
| 6 | REGISTERED PERSON A | UNREGISTERED PERSON | | |
| 7 | REGISTERED PERSON A | UNREGISTERED PERSON | | |
| 8 | REGISTERED PERSON A | UNREGISTERED PERSON | | |
| 9 | REGISTERED PERSON A | UNREGISTERED PERSON | | |
| 10 | REGISTERED PERSON A | UNREGISTERED PERSON | | |
| 11 | REGISTERED PERSON A | UNREGISTERED PERSON | | |
| 12 | | UNREGISTERED PERSON | | |
| 13 | | UNREGISTERED PERSON | | |
| 14 | | | | |
| - OMITTED - | | | | |
| 114 | | | REGISTERED PERSON B | | ~1503
| 115 | | | REGISTERED PERSON B | |
| 116 | | | REGISTERED PERSON B | |
| 117 | | | REGISTERED PERSON B | |
| 118 | | | REGISTERED PERSON B | |
| 119 | | | | |
| 120 | | | | |
| 121 | | | | UNREGISTERED PERSON | ~1504
| 122 | | | | UNREGISTERED PERSON |
| 123 | | | | UNREGISTERED PERSON |
| 124 | | | | UNREGISTERED PERSON |
| 125 | | | | UNREGISTERED PERSON |
| 126 | | | | UNREGISTERED PERSON |

(table: ~1500)

FIG.17

| | GROUP A | GROUP B | GROUP C |
|---|---|---|---|
| ENTRY/EXIT (SINGLE) | ◯ | ✕ | ◯ |
| ENTRY/EXIT (GROUP) | UNREGISTERED PERSON GROUP B | GROUP A | ✕ |
| NOTIFICATION DEACTIVATION | ◯ | ✕ | ✕ |

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a program.

Description of the Related Art

There has conventionally been a demand for managing persons who enter and exit a specific room or area, for example, by recording the entry and exit of persons into and from the room or area and permitting specific persons to enter the room or area. Japanese Patent Application Laid-Open No. 2017-215737 discusses a technique for acquiring a pre-registered face image for user authentication and the face image of a user, comparing the two face images, and, when the face images match, recording entry and exit information for the user. In this technique, if the face image for user authentication and the face image of a user do not match, the locked entrance and exit are not unlocked. Japanese Patent Application Laid-Open No. 2020-169860 discusses a technique used by an alarm generation apparatus to cancel an alarm upon successful face recognition.

However, the above-described art discussed in Japanese Patent Application Laid-Open No. 2017-215737 has a problem that it is not possible to manage or record the entry into and exit from a room where the entrance and exit cannot be locked for reasons of facility operations. The technique discussed in Japanese Patent Application Laid-Open No. 2020-169860 is not a technique for managing the entry into and exit from a specific area but a technique for facilitating cancellation of an alarm.

SUMMARY

According to an aspect of the present disclosure, an information processing apparatus that issues a notification based on a captured image, the information processing apparatus includes at least one processor causing the information processing apparatus to act as a notification unit configured to instruct a notification apparatus to issue a notification in a case where a video image capturing an entrance of a specific location includes an unregistered person moving toward the specific location, and a notification deactivation unit configured to deactivate the notification by the notification apparatus in a case where a video image capturing the specific location includes a pre-registered person.

According to another aspect of the present disclosure, an information processing apparatus that issues a notification based on a captured image, the apparatus includes at least one processor causing the information processing apparatus to act as a notification unit configured to instruct a notification apparatus to issue a notification in a case where a video image capturing an entrance of a specific location includes an unregistered person moving toward the specific location, and a notification deactivation unit configured to deactivate the notification by the notification apparatus in a case where the video image capturing an entrance of the specific location includes a pre-registered person moving toward the specific location.

Further features of various embodiments will become apparent from the following description of exemplary embodiments with reference to the attached drawings.

BRIEF DESCRIPTION OF THE DRAWINGS

FIG. 10 illustrates lists of combinations of a person who actually passed and a determination result.

FIG. 14 illustrates an example of a user interface (UI) for the entry and the exit records at the time of emergency.

FIG. 15 illustrates an example of a matching result list for each frame.

FIG. 17 illustrates a registered person permission condition for each group.

DESCRIPTION OF THE EMBODIMENTS

Exemplary embodiments will be described in detail below with reference to the accompanying drawings.

The following exemplary embodiments are to be considered as illustrative examples for achieving aspects of the present disclosure, and may be corrected, modified, and combined as required depending on the configuration of an apparatus according to the present disclosure and other various conditions. Some embodiments are not limited to the following exemplary embodiments.

A first exemplary embodiment will be described below centering on an image analysis system that analyzes video images of the entry and exit to determine a registered person or an unregistered person, records an entry and an exit result, issues a notification upon detection of an unregistered person in the entry video image, and deactivates a notification upon detection of a registered person in a video image for deactivating notification. The following exemplary embodiments assume a specific room as a location to be managed, and are also applicable to a system that manages the entry and the exit records of not only a room but also a specific location. The system may generate and manage an entry record and an exit record for a specific location.

Figure 1:
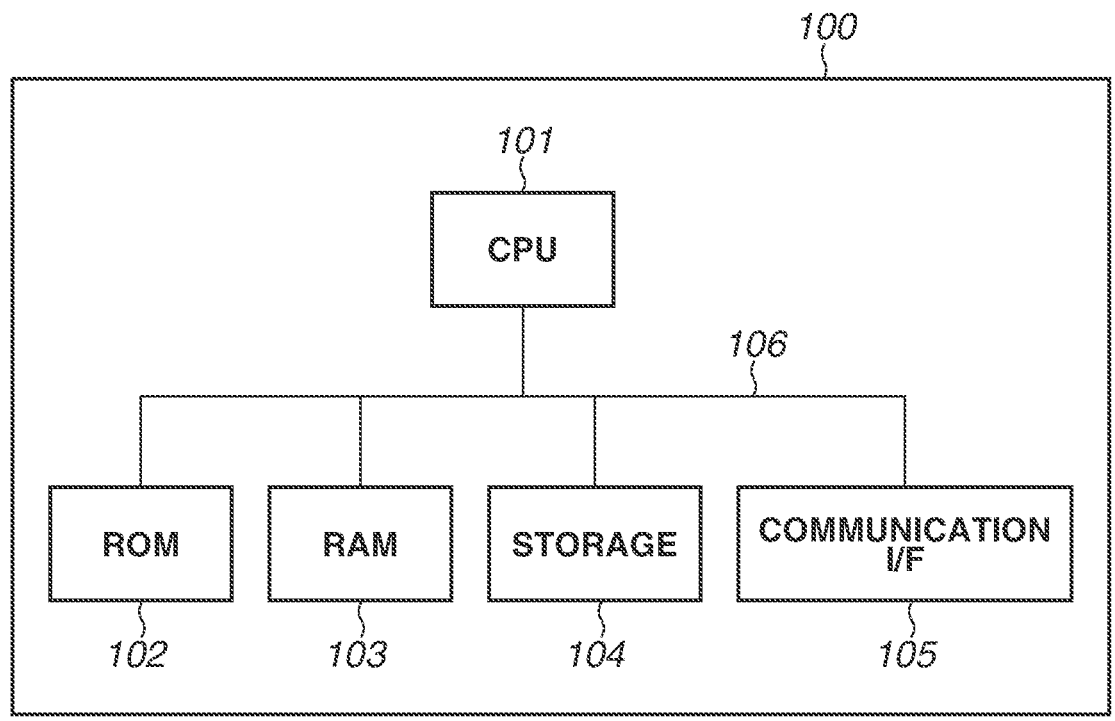
FIG. 1 is a block diagram illustrating an example of a hardware configuration of an information processing apparatus.

FIG. 1 is a block diagram illustrating an example of a hardware configuration of an information processing apparatus 100 according to a first exemplary embodiment.

The information processing apparatus 100 according to the present exemplary embodiment includes a central processing unit (CPU) 101, a read only memory (ROM) 102, a random access memory (RAM) 103, a storage 104, and a communication interface (I/F) 105. The ROM 102, the RAM 103, the storage 104, and the communication I/F 105 are connected to an internal bus 106.

The CPU 101 is a central processing unit that totally controls the operations of the information processing apparatus 100. The ROM 102 is a nonvolatile memory that stores programs and various initial setting data for the CPU 101 to execute processing. The RAM 103 is a volatile memory that functions as the main memory of the CPU 101 and a work area. The RAM 103 temporarily stores programs and image data. In executing the processing, the CPU 101 loads a necessary program from the ROM 102 into the RAM 103 and then executes the program to implement various function operations.

The storage 104 is a recording device having a much larger capacity than the RAM 103, such as a hard disk drive (HDD) and a solid state drive (SSD). The storage 104 stores an operating system (OS or basic software), the entry and the exit records, a notification determination program, and other various data according to the present exemplary embodiment. The storage 104 can also record image data acquired via a network.

When power is turned ON, the CPU 101 executes the activation program stored in the ROM 102. This activation program is used to load the OS stored in the storage 104 into the RAM 103. After the OS is activated, when the user issues an instruction for activating entry and exit recording and notification determination processing via an operation unit 107 illustrated in FIG. 2, the CPU 101 loads the entry and exit recording and notification determination processing programs from the storage 104 into the RAM 103. Thus, the CPU 101 becomes ready to execute the entry and exit recording and notification determination processing. The CPU 101 also stores various data used for the operations of the entry and exit recording and notification determination processing program in the RAM 103 for read and write operations.

The communication I/F 105, for example, an interface of a Local Area Network (LAN), communicates with network cameras and other computers via a network.

Images to be used in the entry and exit recording and notification determination processing according to the present exemplary embodiment, the entry and exit recording and notification determination processing programs for implementing the entry and exit recording and notification determination processing, and various data to be used in the entry and exit recording and notification determination processing may be acquired via a network. The information processing apparatus 100 can be configured by one apparatus having the configuration illustrated in FIG. 1, such as a personal computer (PC) and a tablet PC. However, the configuration illustrated in FIG. 1 may be implemented by separate hardware components, i.e., the information processing apparatus 100 may be configured by a plurality of apparatuses. Calculation processing involved in the entry and exit recording and notification determination processing may be processed by using a Graphics Processing Unit (GPU), which is not illustrated.

Figure 2:
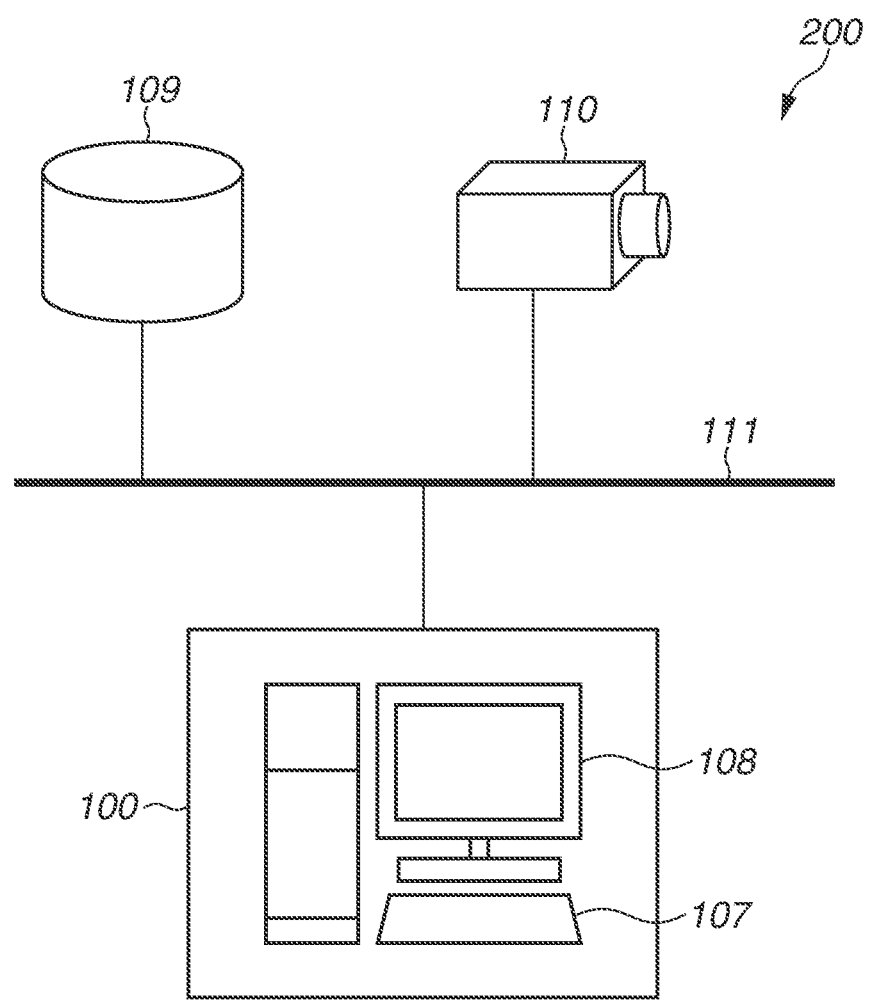
FIG. 2 illustrates an example of an overall configuration of an image analysis system including the information processing apparatus.

FIG. 2 illustrates an example of an overall configuration of an image analysis system 200 including the information processing apparatus 100 according to the present exemplary embodiment.

The image analysis system 200 includes the information processing apparatus 100, a storage device 109, and a camera 110. The information processing apparatus 100, the storage device 109, and the camera 110 are connected via a network 111 so that they can communicate with each other. The network 111 is, for example, a LAN. The communication standard, scale, and configuration of the network 111 do not matter as long as the information processing apparatus 100, the camera 110, and the storage device 109 can communicate with each other. The physical connection form of the network 111 may be either a wired connection or a wireless connection. The connection between the information processing apparatus 100, the storage device 109, and the camera 110 is not limited to the connection by the network 111, these apparatuses may be connected via a Universal Serial Bus (USB).

As the hardware configuration, the information processing apparatus 100 may include the operation unit 107 and a display unit 108 in addition to the configuration in FIG. 1. The operation unit 107 includes a keyboard and a pointing device, such as a mouse. The display unit 108 (e.g., a monitor, such as a liquid crystal display (LCD)) is a display device used for browsing when the user (operator) operates the information processing apparatus 100.

The camera 110, such as a network camera, is an imaging apparatus having a function of capturing an image within an imaging range and transmitting the captured image to the information processing apparatus 100 via the network 111. The camera 110 is a Pan Tilt Zoom (PTZ) camera configured to change the imaging region. In this case, the camera 110 may have a function of transmitting imaging parameters including information about the imaging direction and imaging angle of view, such as the pan angle, tilt angle, and zoom magnification to the information processing apparatus 100 via the network 111.

The present exemplary embodiment will be described below centering on a case where the camera 110 is a network camera serving as a monitoring camera, some embodiments are not limited thereto. Examples of the camera 110 include digital still cameras, digital video cameras, smartphones and tablet terminals having camera functions, industrial cameras, in-vehicle cameras, and wearable cameras. The information processing apparatus 100 receives as an input image a captured image captured by the camera 110 from the camera 110 via the network 111, and then subjects the received input image to processing (described below).

The camera 110 may transmit the captured image to the storage device 109 or a storage device of other apparatuses via the network 111. In this case, the information processing apparatus 100 may receive as an input image a captured image stored in the storage device 109 or a storage device of other apparatuses, via the network 111. The input image is not limited to a captured image captured by the camera 110. For example, the input image may be a partial image, which is a part of the captured image. The configuration of the image analysis system 200 illustrated in FIG. 2 is an example, and devices may be integrated like a tablet PC. More specifically, the information processing apparatus 100 may have the function of the camera 110.

The information processing apparatus 100 according to the present exemplary embodiment acquires an input image including an image of a person via the camera 110. The information processing apparatus 100 selects the person from the acquired input image and then sets the person as a registered person (pre-registered person or registrant) by a user operation. The input image including an image of a person may be acquired from the storage device 109 via the network 111. The present exemplary embodiment acquires a video image via the camera 110 and stores the acquired video image in the ROM 102, determines a registered person or an unregistered person (non-registrant) according to the entry and exit recording and notification determination processing program loaded in the RAM 103, and generates and updates the entry and the exit records. When the person is determined to be an unregistered person, the present exemplary embodiment issues a notification. When a registered person is determined to have been detected, notification deactivation processing is performed.

Figure 3:
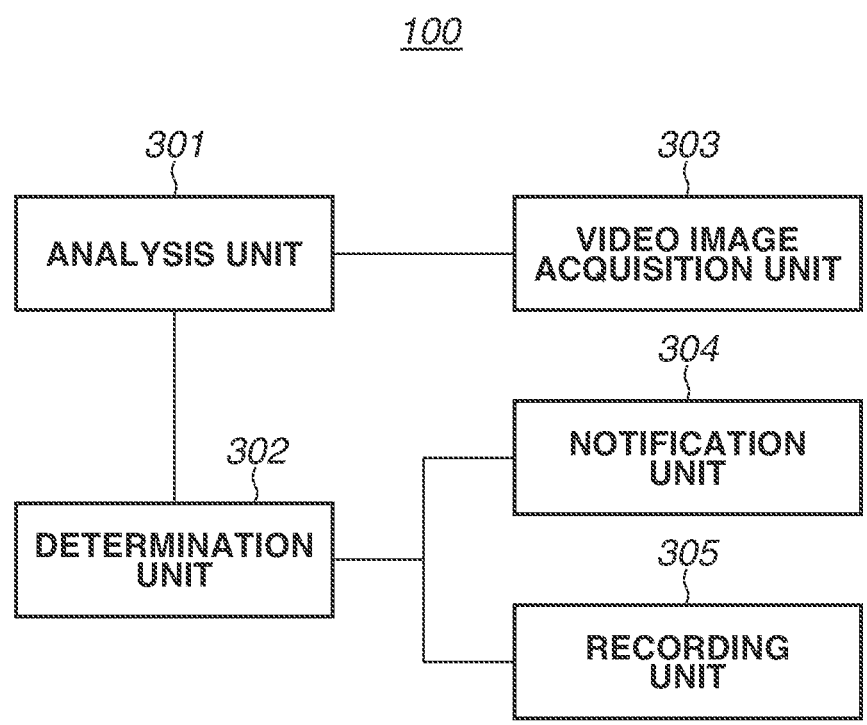
FIG. 3 is a block diagram illustrating an example of a functional configuration of an information processing apparatus according to a first exemplary embodiment.

FIG. 3 is a block diagram illustrating an example of a functional configuration of the information processing apparatus 100 according to the present exemplary embodiment.

As illustrated in FIG. 3, the information processing apparatus 100 includes an analysis unit 301, a determination unit 302, a video image acquisition unit 303, a notification unit 304, and a recording unit 305. At least a part of the function of each element of the information processing apparatus 100 illustrated in FIG. 3 can be implemented when the CPU 101 executes a program. However, at least a part of elements of the information processing apparatus 100 illustrated in FIG. 3 may operate as dedicated hardware. In this case, the dedicated hardware operates under the control of the CPU 101. Each function of the information processing apparatus 100 illustrated in FIG. 3 will be described below with reference to FIG. 4.

Figure 4:
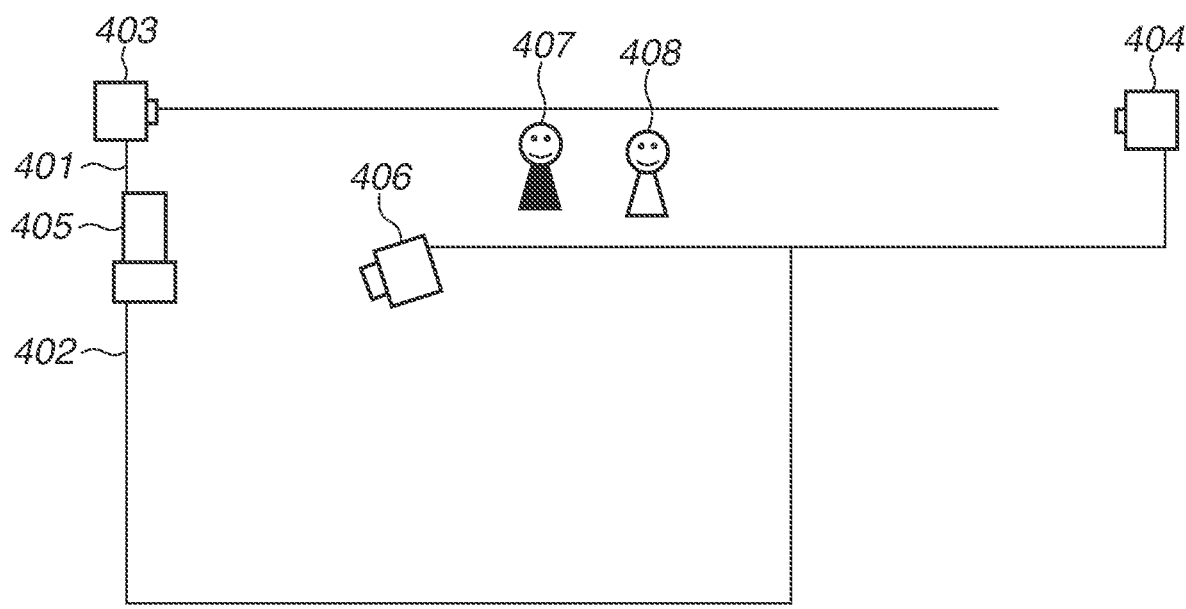
FIG. 4 illustrates an environment where an image of entry of a registered person (registrant) and an unregistered person (non-registrant) is captured.

FIG. 4 illustrates an environment where an image of the entry of a person as a registered person and a person as an unregistered person is captured in a facility subjected to the entry/exit management according to the present exemplary embodiment. The structure of the facility illustrated in FIG. 4 includes a passage 401 and a room 402 subjected to the entry/exit management. In the passage 401, there are installed a first camera 403 for acquiring an entry video image including a person moving toward the room 402 and a second camera 404 for acquiring an exit video image including a person exiting the room 402. More specifically, in the entry video image captured by the first camera 403, the face of the person moving toward the room 402 can be detected but the face of the person exiting the room 402 cannot be detected because the exiting person is captured on the back. Likewise, in the exit video image captured by the second camera 404, the face of the person exiting the room 402 can be detected but the face of the person moving toward the room 402 cannot be detected because the moving person is captured on the back. In the vicinity of the entrance of the room 402, there are installed a notification apparatus 405 that issues a notification about the entry of an unregistered person, and a third camera 406 that acquires the video image for deactivating notification which reflects the inside of the room 402. The video image for deactivating notification refers to a video image that is referenced to deactivate a notification from the notification apparatus 405.

The installation positions of the first camera 403 and the second camera 404 may be determined according to the layout of the passage 401 and the room 402 in the facility, and can be changed within the ambit of the subject matter of the disclosure. The installation positions of the notification apparatus 405 and the third camera 406 can also be changed according to the notification target and the traffic flowchart in the facility. According to the present exemplary embodiment, the notification apparatus 405 is a warning light that is installed at a position where the notification apparatus 405 is easy to view from the passage 401 at the entry into the room 402 and from a staff room (not illustrated). The notification apparatus 405 may be a speaker or a notification server. In a case where the notification apparatus 405 is a notification server, a push notification may be issued to the user, such as a facility administrator and a registered person, by using a device (not illustrated).

Referring to FIG. 4, a person 407 is a registered person, i.e., a facility staff according to the present exemplary embodiment.

A person 408 is an unregistered person, i.e., a customer according to the present exemplary embodiment. According to the present exemplary embodiment, the person 407 is permitted to enter the room 402 alone, and the person 408 is not permitted to enter the room 402 alone. However, the person 408 is permitted to enter the room 402 if the person 408 is accompanied by the person 407.

The video image acquisition unit 303 in FIG. 3 acquires an entry video image from the first camera 403. Then, the analysis unit 301 detects the persons 407 and 408 in the entry video image. The analysis unit 301 analyzes the detected persons, and the determination unit 302 determines whether each person is a registered person. Then, the determination unit 302 records the determination result in the recording unit 305 corresponding to the storage 104. For example, in a case where the persons 407 and 408 are detected in the entry video image, the person 407 is determined to be a registered person, and the person 408 is determined to be an unregistered person. In this case, the notification unit 304 notifies the notification apparatus 405 of the detection of an unregistered person.

Referring to the example in FIG. 4, the person 407 permits the entry of the person 408 by accompanying the person 408. Then, the persons 407 and 408 are captured in the video image for deactivating notification captured by the third camera 406. The video image acquisition unit 303 acquires the video image for deactivating notification from the camera 406. Then, a registered person is detected through the analysis by the analysis unit 301 and the determination by the determination unit 302. Upon detection of a registered person, the notification unit 304 deactivates a notification by the notification apparatus 405. After completion of works in the room 402, the persons 407 and 408 exit the room 402 through the passage 401. When exiting the room 402, the video image acquisition unit 303 acquires an exit video image from the second camera 404, and the analysis unit 301 detects the persons 407 and 408 in the exit video image. The analysis unit 301 analyzes the detected person, and the determination unit 302 determines whether the detected person is a registered person. Then, the determination unit 302 records the determination result in the recording unit 305.

As described above, the video image acquisition unit 303 is connected to the first camera 403, the second camera 404, and the third camera 406 in FIG. 4 to acquire video images. Then, the analysis unit 301 acquires video images from the video image acquisition unit 303 and performs image analysis processing. In the image analysis processing, the analysis unit 301 detects a person in the acquired video image and then detects the face of the detected person. Then, the analysis unit 301 detects the eyes, nose, mouth, and other organs to acquire the facial feature quantities. The determination unit 302 compares the facial feature quantities of a person in the video image acquired by the analysis unit 301 with the facial feature quantities of one or more pre-registered persons to determine whether the person is a registered person. The determination unit 302 determines the similarity targeting a registered person having the highest similarity to the detected person out of registered persons having a similarity to the person by a value greater than a predetermined value. In a case where the similarity is less than the predetermined value for all registered persons, the determination unit 302 determines that the detected person is an unregistered person.

In the processing described below, a registered person list is prepared and information about the facial feature quantities of registered persons is prestored in the storage 104 or the storage device 109. Processing for determining whether the detected person is a registered person may be performed by using a plurality of detection results for a person detected and identified in a plurality of frames.

Figure 5:
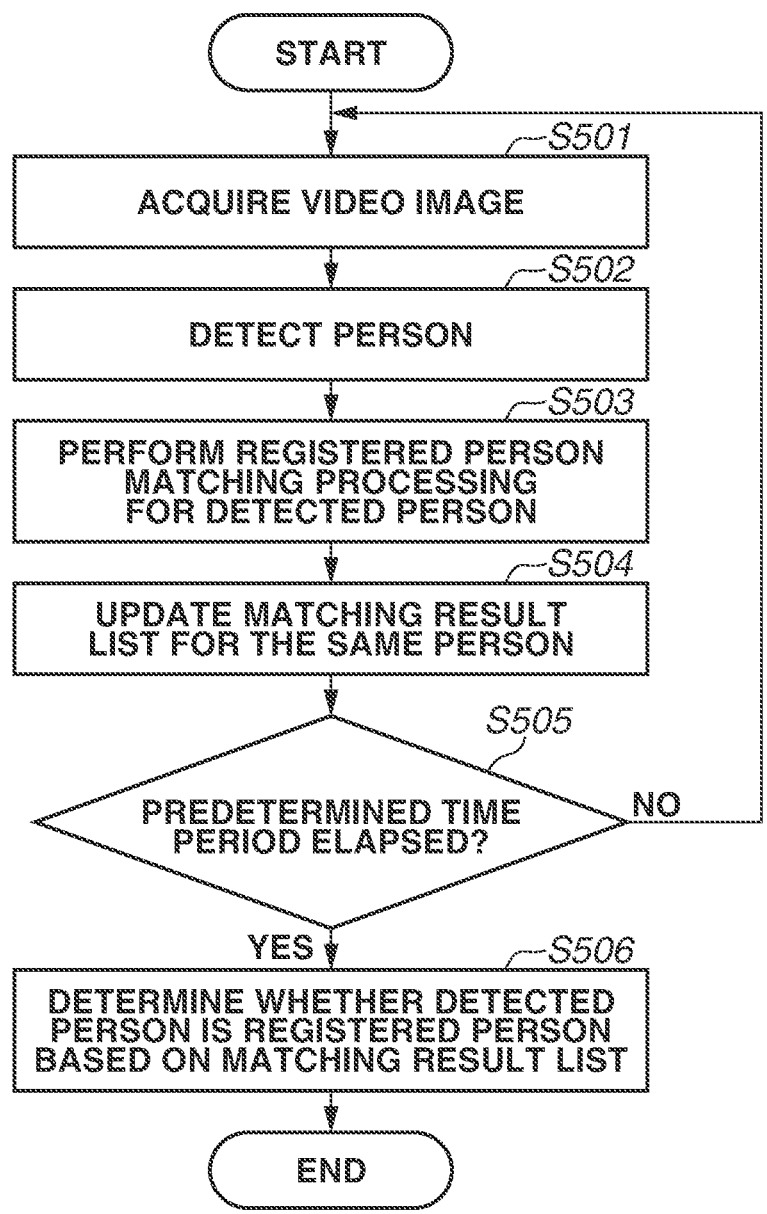
FIG. 5 is a flowchart illustrating an example of processing for determining whether a person in a video image is a registered person (registrant) by using a plurality of detection results.

A method for determining whether the detected person is a registered person (registrant) by using a plurality of detection results in a plurality of frames will be described below with reference to the flowchart illustrated in FIG. 5. FIG. 5 is a flowchart illustrating an example of processing for determining whether a person in the video image is a registered person by using a plurality of detection results. The processing in FIG. 5 may be started at the timing of starting the processing of the image analysis system 200. Alternatively, the user may arbitrarily determine to start the processing. The information processing apparatus 100 can implement each piece of the processing illustrated in FIG. 5 when the CPU 101 loads and executes a necessary program. An example of determining whether a detected person is a registered person based on an entry video image will be described below. The processing also applies to an exit video image and the video image for deactivating notification.

In step S501, the video image acquisition unit 303 acquires an entry video image from the first camera 403.

In step S502, the analysis unit 301 detects a person in the entry video image and acquires the facial feature quantities of the detected person. In a case where a plurality of persons is detected in the video image, the analysis unit 301 subjects all of the detected persons to the following processing.

In step S503, the determination unit 302 compares the facial feature quantities of the detected person with the facial feature quantities of one or more pre-registered persons (registrants) and then acquires information about the highest similarity as a result of the comparison with the registered persons.

In step S504, the determination unit 302 generates a matching result list for the same person. The matching result list is a list of detection results for each frame for the same person. The matching result list may be recorded in the recording unit 305 or stored as internal data of the analysis unit 301 or the determination unit 302. The determination unit 302 determines whether the detected person is the same person between a plurality of frames based on the detected coordinates on the image between frames. Alternatively, the determination unit 302 may determine persons having similar feature quantities including the colors and shapes of clothes and hair to be the same person.

In step S505, the determination unit 302 determines whether a predetermined time period has elapsed since a first person was detected. If the predetermined time period has not elapsed (NO in step S505), the CPU 101 repeats this processing from step S501. On the other hand, if the predetermined time period has elapsed (YES in step S505), the processing proceeds to step S506.

In step S506, the determination unit 302 determines whether the detected person is a registered person with reference to the matching result list. In this processing, the determination unit 302 references the person having the highest similarity out of the matching result list. In a case where the similarity is equal to or greater than a predetermined value, the determination unit 302 determines that the detected person is the same person as a registered person. On the other hand, in a case where the similarity in the matching result list does not exceed the predetermined value, the determination unit 302 determines that the detected person is an unregistered person (non-registrant).

When the determination unit 302 determines that there is an unregistered person, the notification unit 304 notifies the notification apparatus 405 illustrated in FIG. 4 of the detection of an unregistered person. The determination result acquired by the determination unit 302 is recorded in the recording unit 305. The exit video image is recorded in the recording unit 305 as an exit record.

A processing flowchart of each element illustrated in FIG. 3 will be described below with reference to the flowcharts in FIGS. 6 to 8.

Figure 6:
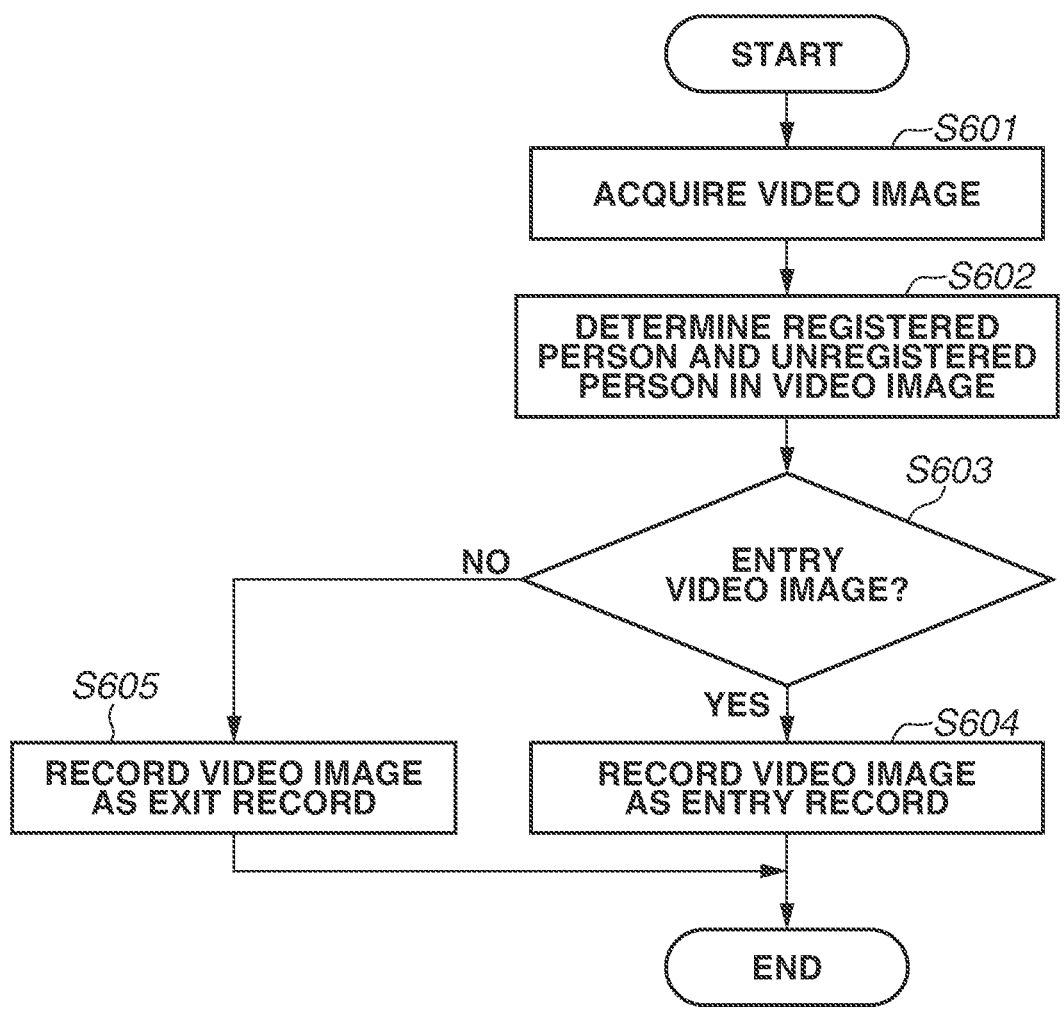
FIG. 6 is a flowchart illustrating an example of processing for recording an entry and an exit record.

FIG. 6 is a flowchart illustrating an example of processing for recording the entry and the exit records according to the present exemplary embodiment. The processing in FIG. 6 may be started at the timing of starting the processing of the image analysis system 200. Alternatively, the user may arbitrarily determine to start the processing. The information processing apparatus 100 can implement each piece of the processing illustrated in FIG. 6 when the CPU 101 loads and executes a necessary program.

In step S601, the video image acquisition unit 303 acquires a video image from the first camera 403 or the second camera 404.

In step S602, the analysis unit 301 performs image analysis processing, and the determination unit 302 determines whether the detected person is a registered person (registrant) or an unregistered person (non-registrant) based on the video image. In this processing, the analysis unit 301 acquires the facial feature quantities from a person in the video image, and the determination unit 302 compares the facial feature quantities of the person in the video image acquired by the analysis unit 301 with the facial feature quantities of one or more pre-registered persons to determine whether the person is a registered person or an unregistered person. In a case where a plurality of persons is detected in the video image, the analysis unit 301 performs the comparison of the facial feature quantities for all of detected persons. In a scene where a person exits the room 402, although the entry video image reflects a person, the facial feature quantities cannot be acquired since the person is captured on the back. In this case, the analysis unit 301 forcibly ends the processing. On the other hand, in a scene where a person exits the room 402, the face of the person can be detected in the exit video image. Therefore, the processing proceeds to step S603. This also applies to a scene where a person is moving toward the room 402.

In step S603, the determination unit 302 determines whether the video image acquired in step S601 is an entry video image. In a case where the acquired video image is an entry video image (YES in step S603), the processing proceeds to step S604. In step S604, the determination unit 302 records the acquired video image in the recording unit 305 as an entry record. The information to be recorded in this case includes the detection time as the entry time, the name of the registered person as the entry person, and information indicating that an unregistered person is included. The information to be recorded may also include images of the detected registered person and an unregistered person, a snap shot taken at the time of entry into the room 402, and video images including the time before and after the entry into the room 402. Upon completion of the processing in step S604, the CPU 101 ends the processing for generating the entry and the exit records.

On the other hand, in a case where the acquired video image is not an entry video image (NO in step S603), the determination unit 302 determines that the acquired video image is an exit video image. Then, the processing proceeds to step S605. In step S605, the determination unit 302 records the acquired video image in the recording unit 305 as an exit record. The information to be recorded in the processing in step S605 is similar to the contents recorded in the processing in step S604. Upon completion of the processing in step S605, the CPU 101 ends the processing for generating the entry and the exit records.

Although the flowchart illustrated in FIG. 6 describes a case where a video image is input from the first camera 403 or the second camera 404, this processing is also applicable to a case where the video image for deactivating notification is acquired from the third camera 406. Although the processing in FIG. 6 generates an entry and an exit record of information for a registered person and an unregistered person, only information for the registered person may be generated as the entry and the exit records.

In this case, after the processing in step S602, the determination unit 201 determines whether a registered person is included in the video image. In a case where a registered person is not included in the video image, the processing exits the flowchart. On the other hand, in a case where a registered person is included in the video image, the processing proceeds to step S603. In steps S604 and S605, the CPU 101 records only registered person information as the entry and the exit records. In the processing in FIG. 6, information may be recorded in the recording unit 305 so that the determination result can be distinguished between a registered person and an unregistered person, or information may be recorded in another recording apparatus. Information may be recorded only for either a registered person or an unregistered person.

Processing for issuing a notification will be described below. FIG. 7 is a flowchart illustrating an example of processing for issuing a notification when an unregistered person attempts to enter the room 402 according to the present exemplary embodiment. The processing in FIG. 7 may be started at the timing of starting the processing of the image analysis system 200. Alternatively, the user may arbitrarily determine to start the processing. The information processing apparatus 100 can implement each piece of the processing illustrated in FIG. 7 when the CPU 101 loads and executes a necessary program.

In step S701, the video image acquisition unit 303 acquires a video image from the first camera 403, the second camera 404, or the third camera 406. Processing in step S702 is similar to the processing in step S602 in FIG. 6, and a redundant description thereof will be omitted.

In step S703, the determination unit 302 determines whether an unregistered person exists among the persons in the acquired video image, with a similar procedure to the above-described procedure. In a case where at least one unregistered person (non-registrant) exists in the acquired video image (YES in step S703), the processing proceeds to step S704. On the other hand, when no unregistered person exists in the acquired video image (NO in step S703), the processing exits the flowchart.

In step S704, the determination unit 302 determines whether the acquired video image in which an unregistered person has been detected is an entry video image. In a case where the acquired video image is an entry video image (YES in step S704), the processing proceeds to step S705. On the other hand, in a case where the acquired video image is not an entry video image (NO in step S704), the processing exits the flowchart.

In step S705, the notification unit 304 performs notification processing using the notification apparatus 405. When the notification processing is performed, the determination unit 302 detects an unregistered person and records the notification issuance as an entry record in the recording unit 305. The contents to be recorded in this case may include the detection date and time, a clipped image of the face portion, and a snap shot.

Processing for canceling a notification will be described below. FIG. 8 is a flowchart illustrating an example of processing for confirming a registered person and deactivating a notification according to the present exemplary embodiment. The processing in FIG. 7 may be started at the timing of starting the processing of the image analysis system 200. Alternatively, the user may arbitrarily determine to start the processing. The information processing apparatus 100 can implement each piece of the processing illustrated in FIG. 8 when the CPU 101 loads and executes a necessary program.

In step S801, the video image acquisition unit 303 acquires a video image from the first camera 403, the second camera 404, or the third camera 406. Processing in step S802 is similar to the processing in step S602 in FIG. 6, and a redundant description thereof will be omitted.

In step S803, the determination unit 302 determines whether a registered person (registrant) exists among the persons in the acquired video image with a similar procedure to the above-described procedure. In a case where at least one registered person exists in the acquired video image (YES in step S803), the processing proceeds to step S804. On the other hand, in a case where no registered person exists in the acquired video image (NO in step S803), the processing exits the flowchart.

In step S804, the determination unit 302 determines whether the acquired video image where a registered person is detected is the video image for deactivating notification.

In a case where the acquired video image is the video image for deactivating notification (YES in step S804), the processing proceeds to step S805. On the other hand, in a case where the acquired video image is not the video image for deactivating notification (NO in step S804), the processing exits the flowchart.

In step S805, the notification unit 304 deactivates the notification processing using the notification apparatus 405. When the notification processing is deactivated, the determination unit 302 may record the notification deactivation as an entry record in the recording unit 305. The contents recorded in this case may include the name and detection time of the registered person detected in this processing, a clipped image of the face portion, and a snap shot.

Figure 7:
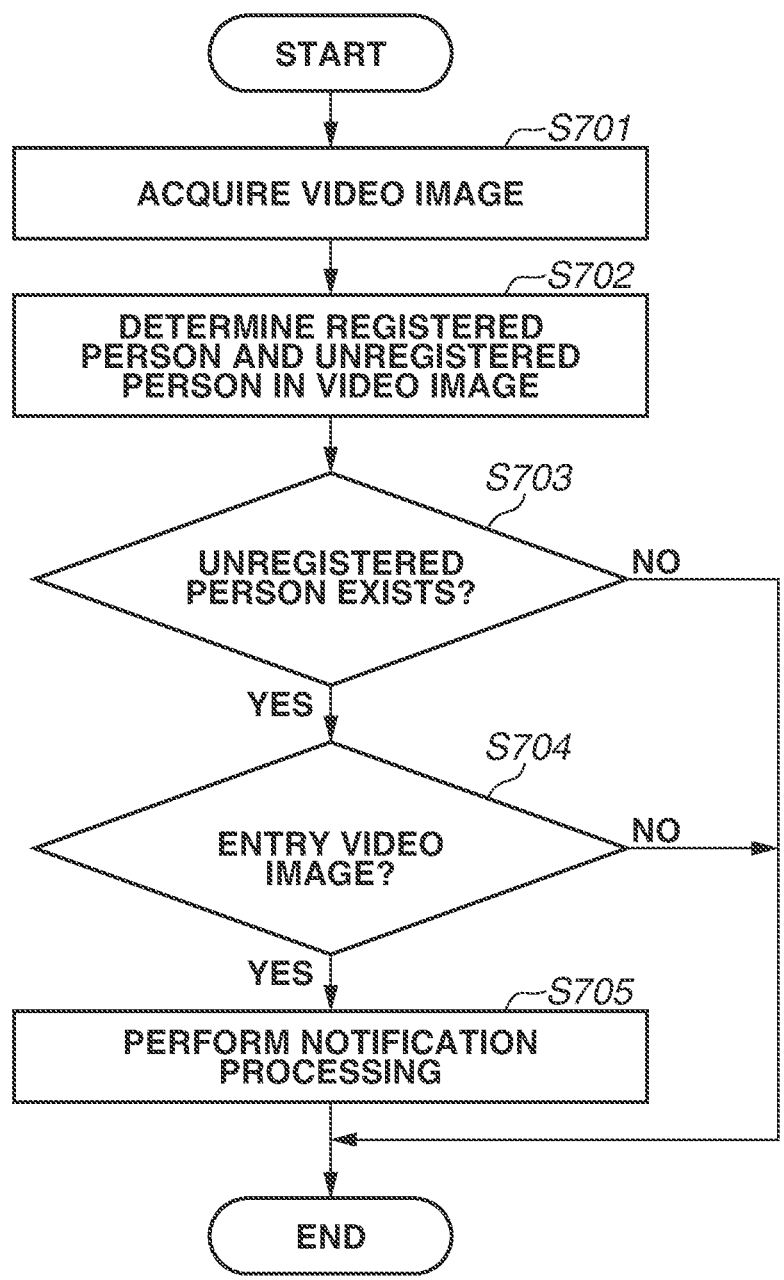
FIG. 7 is a flowchart illustrating an example of processing for issuing a notification when an unregistered person (non-registrant) attempts entering a room.
Figure 8:
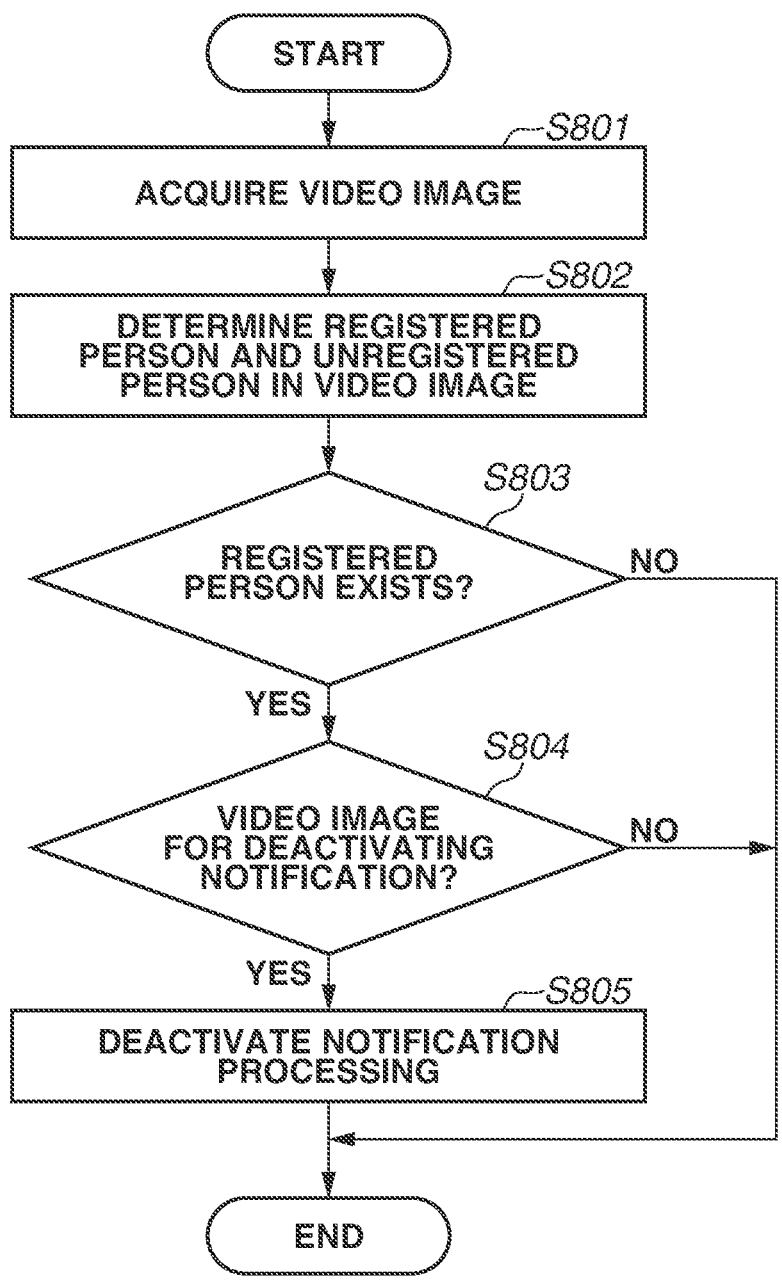
FIG. 8 is a flowchart illustrating an example of processing for confirming a registered person (registrant) and deactivating a notification.

The order of the processing illustrated in FIGS. 6 to 8 may be exchanged as long as the subject matter of the disclosure can be implemented. Although the processing illustrated in FIGS. 6 to 8 has been described above as separate flowcharts, the processing may be implemented as the same single flowchart. In this case, the processing for acquiring a video image in steps S601, S701, and S801, the processing for determining a registered person and an unregistered person in the video image in steps S602, S702, and S802, and the processing for determining the acquisition source of a video image in steps S603, S704, and S804 may be configured as common processing. When these pieces of processing are implemented as the same single flowchart, the order of the processing may be changed as long as the subject matter of the disclosure can be implemented, or may be implemented in parallel processing.

In addition, there may be provided a method for deactivating a notification, other than the method for deactivating a notification when a registered person is captured in the video image for deactivating notification as illustrated in FIG. 8. For example, the notification apparatus 405 may be provided with a notification deactivation button or separately provided with a notification deactivation application. In a case where the notification deactivation is performed with the button or application, information different from the one recorded when notification is deactivated with the procedure illustrated in FIG. 8 may be recorded. More specifically, in a case where a notification is deactivated with the notification deactivation button, a message, such as "Forcibly Deactivated by Notification Deactivation Button", and the deactivation time may be recorded.

As described above, according to the present exemplary embodiment, a notification is issued upon detection of an unregistered person in the entry video image, and a notification is deactivated upon detection of a registered person in the video image for deactivating notification. If an unregistered person enters the room 402 alone, a notification, such as a warning light, enables the unregistered person to notice that the admission is inhibited or enables a registered person, such as a facility staff, to withhold the unregistered person. If an unregistered person enters the room 402 together with a registered person, a notification is deactivated to prevent the facility staff from incorrectly withholding the unregistered person even after the unregistered person has entered the room 402.

In the configuration according to the first exemplary embodiment, a registered person may be incorrectly determined to be an unregistered person depending on the facial feature quantities acquired by the analysis unit 301 and the determination result by the determination unit 302. A second exemplary embodiment will be described below centering on a method for correcting a wrong entry record by using registered person information acquired in the notification deactivation processing and correcting a wrong exit record by using the entry record. The basic configuration of the image analysis system according to the present exemplary embodiment and the hardware configuration and the functional configuration of the information processing apparatus 100 are similar to those in FIGS. 1, 2, and 3, respectively, and thus redundant descriptions thereof will be omitted. Differences from the first exemplary embodiment will be described below.

Processing for correcting a wrong entry record or a wrong exit record in a case where a registered person is incorrectly determined to be an unregistered person will be described below with reference to FIGS. 9 to 12.

Figure 9:
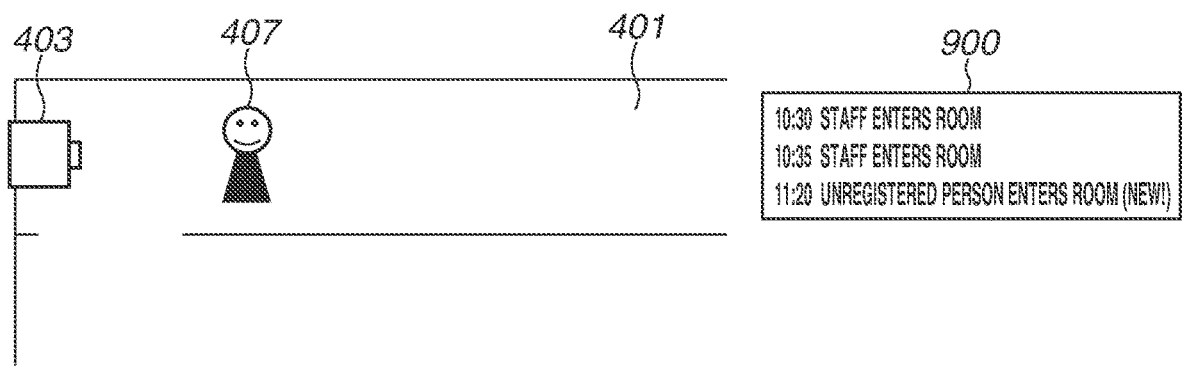
FIG. 9 illustrates a state where a person in a passage is captured.

FIG. 9 illustrates a state where the person 407 in the passage 401 is captured.

FIG. 9 illustrates the first camera 403 for capturing an entry video image, the person 407, and an entry record 900.

Referring to the example illustrated in FIG. 9, the person 407 is captured in the entry video image acquired by the video image acquisition unit 303. As described above in the first exemplary embodiment, in step S601, the video image acquisition unit 303 acquires an entry video image, and the analysis unit 301 detects a person in the entry video image acquired in step S602 according to the processing in FIG. 6. Then, the analysis unit 301 acquires the facial feature quantities of the detected person. Then, the determination unit 302 compares the facial feature quantities of the detected person with the facial feature quantities of pre-registered persons. As a result of the comparison, if there is no pre-registered person having a similarity exceeding a predetermined value, the determination unit 302 determines the person 407 to be an unregistered person. In step S604, information about an unregistered person entry is recorded in the entry record 900. If the person 407 actually is a registered person, the person 407 is incorrectly determined to be an unregistered person.

If the person 407 is incorrectly determined to be an unregistered person when exiting the room 402 although the person 407 is the same person as the registered person, information as an unregistered person will be recorded in the exit record. A method for correcting the entry and the exit records in such a case will be described below with reference to FIGS. 10 to 12.

FIG. 10 illustrates a list of combinations of the person who actually passed and the determination result. Table 1001 illustrates a list of combinations of persons who actually passed, determination results in the entry record, and determinations on the notification deactivation. Table 1002 illustrates a list of persons who actually passed, determination results in the exit record, and entry results in the entry record.

Figure 11:
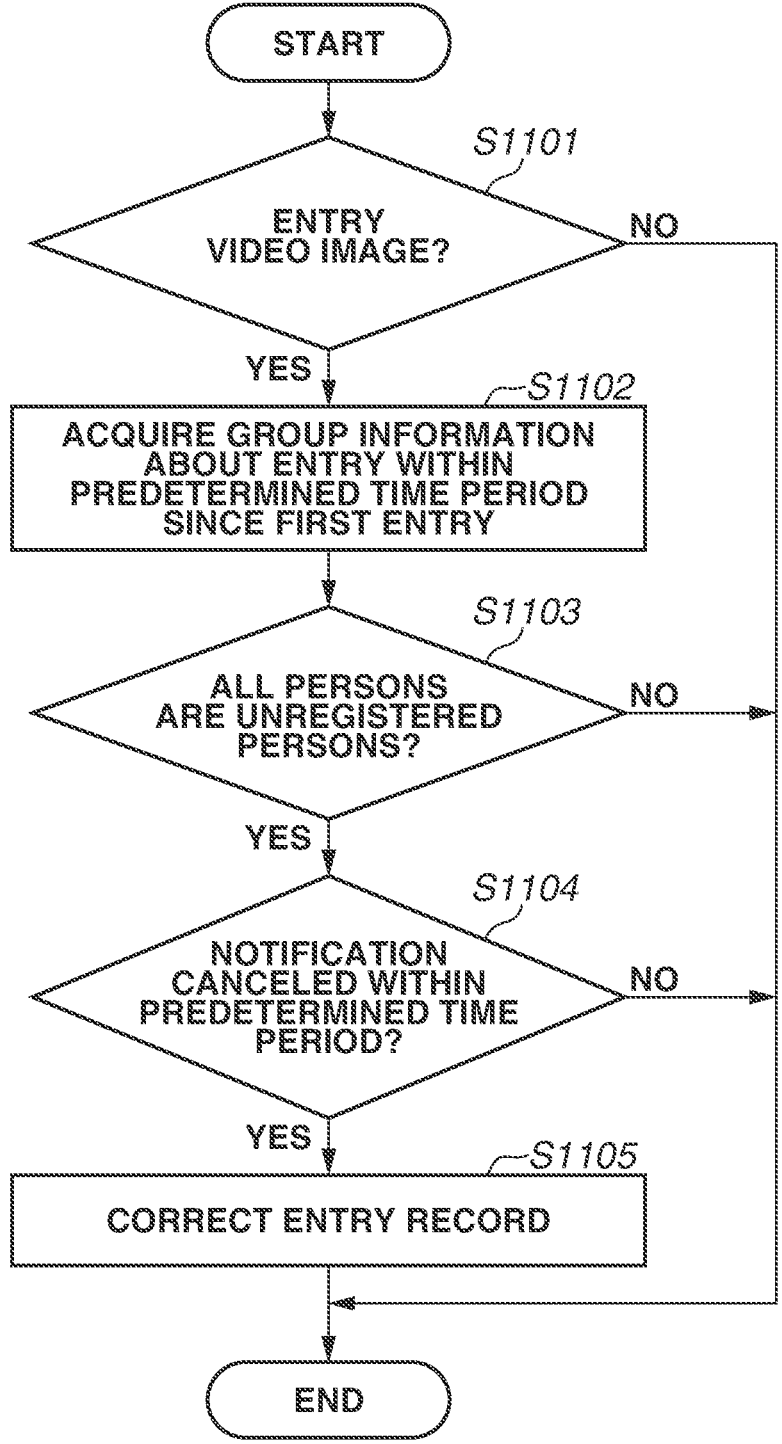
FIG. 11 is a flowchart illustrating an example of processing for correcting the entry record.

A method for correcting a wrong entry record will be described below with reference to Table 1001 illustrated in FIGS. 11 and 10. FIG. 11 is a flowchart illustrating an example of processing for correcting the entry record according to the present exemplary embodiment. The processing in FIG. 11 may be started at the timing of starting the processing of the image analysis system 200. Alternatively, the user may arbitrarily determine to start the processing. The information processing apparatus 100 can implement each piece of the processing illustrated in FIG. 11 when the CPU 101 loads and executes a necessary program.

In step S1101, the determination unit 302 determines whether the video image acquired by the video image acquisition unit 303 is an entry video image. In a case where the acquired video image is an entry video image (YES in step S1101), the processing proceeds to step S1102. On the other hand, in a case where the acquired video image is not an entry video image (NO in step S1101), the processing exits the flowchart.

In step S1102, the determination unit 302 acquires information about the group of persons who entered the room 402 within a predetermined time period since the first person entered the room 402, from an entry record. In a case where no person has been detected within a predetermined time period in the time zone preceding the detection time of an arbitrary detected person in time series, the person is determined to be the first person who entered the room 402. Zero or more persons who entered the room 402 within a predetermined time period since the entry of the first person are assumed to be a group of persons who entered the room 402 within the predetermined time period.

In step S1103, the determination unit 302 determines whether all of the persons belonging to the group are unregistered persons. In a case where all persons are unregistered persons (YES in step S1103), the processing proceeds to step S1104. On the other hand, in a case where at least one of the persons is a registered person (NO in step S1103), the entry record does not need to be corrected. Then, the processing exits this flowchart.

In step S1104, the determination unit 302 references the entry record recorded in the recording unit 305 to determine whether the notification deactivation processing is performed within a predetermined time period since a notification was issued.

In a case where the notification deactivation is performed within the predetermined time period since a notification was issued (YES in step S1104), the processing proceeds to step S1105. In step S1105, the determination unit 302 corrects the entry record. On the other hand, in a case where the notification deactivation is not performed within the predetermined time period since a notification was issued (NO in step S1104), the determination unit 302 determines that only unregistered persons actually entered the room 402, and therefore does not correct the entry record. Then, the processing exits this flowchart.

The correction method in step S1105 will be described in detail below with reference to Table 1001.

Referring to Table 1001, if a person who actually passed is a registered person, and the determination result for the entry video image is an unregistered person, the person is determined to be a registered person in the video image for deactivating notification or the button for deactivating notification is operated by the registered person. Thus, the notification deactivation is performed. Accordingly, the determination unit 302 acquires information about the registered person who deactivated the notification, and corrects the entry record immediately before the deactivation. If a person who actually passed is an unregistered person, and the determination result for the entry video image is an unregistered person, the unregistered person cannot perform the notification deactivation. Therefore, since there is no record of the notification deactivation, the entry record remains unchanged.

If a person who actually passed is a combination of a registered person and an unregistered person and the determination result for the entry video image is an unregistered person for the two persons, the person is determined to be a registered person in the video image for deactivating notification or the button for deactivating notification is operated by the registered person. Therefore, the notification deactivation is performed. In this case, the determination unit 302 acquires information about the registered person who deactivated the notification, and corrects the entry record immediately before the deactivation. In this case, the entry record immediately before the deactivation is recorded for the two persons. Basically, since it is common that the registered person enters the room 402 first, the determination unit 302 corrects information about the person with the earlier detection time out of recorded information. Alternatively, the determination unit 302 may compare the face images of the two persons acquired in the entry video image with the face image acquired from the video image for deactivating notification at the time of the notification activation, and change information for the person having higher similarity of the facial feature quantities. In a case where the registered person follows the unregistered person for reasons of facility operations, the determination unit 302 may correct information about the person with the later detection time.

Although, in step S1101, the determination unit 302 determines whether the acquired video image is an entry video image, a processing program may subject only the entry video image to processing. In this case, the program starts processing from the processing in step S1102.

Figure 12:
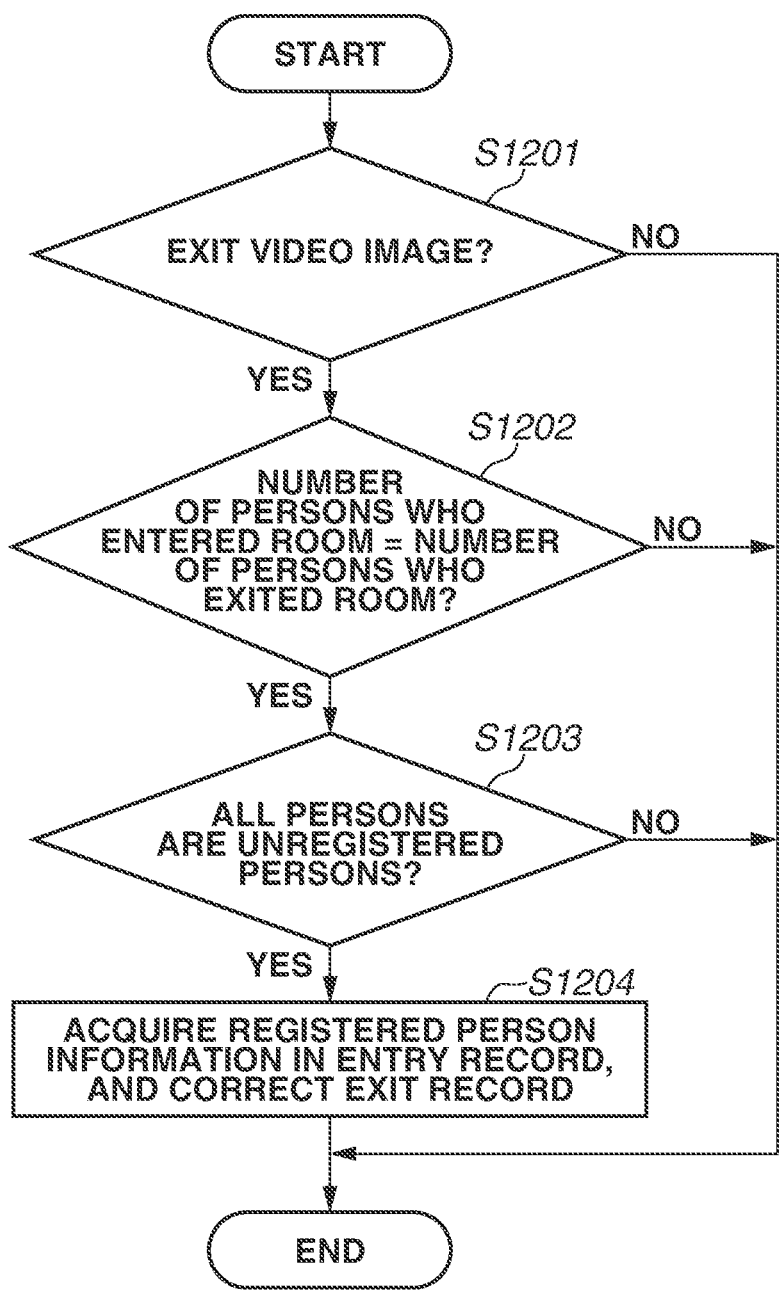
FIG. 12 is a flowchart illustrating an example of processing for correcting the exit record.

A method for correcting a wrong exit record will be described below with reference to FIG. 12 and Table 1002 in FIG. 10. FIG. 12 is a flowchart illustrating an example of processing for correcting the exit record according to the present exemplary embodiment. The processing in FIG. 12 may be started at the timing of starting the processing of the image analysis system 200. Alternatively, the user may arbitrarily determine to start the processing. The information processing apparatus 100 can implement each piece of the processing illustrated in FIG. 12 when the CPU 101 loads and executes a necessary program.

In step S1201, the determination unit 302 determines whether the video image acquired in the video image acquisition unit 303 is an exit video image. In a case where the acquired video image is not an exit video image (NO in step S1201), the processing exits this flowchart. On the other hand, in a case where the acquired video image is an exit video image (YES in step S1201), the processing proceeds to step S1202.

In step S1202, the determination unit 302 determines whether the number of persons who entered the room 402 recorded in the entry record coincides with the number of persons who exited the room 402 recorded in the exit record. In a case where the number of persons who entered the room 402 does not coincide with the number of persons who exited the room 402 (NO in step S1202), the processing exits this flowchart. Then, the CPU 101 waits until a person is detected in a new exit video image. On the other hand, in a case where the number of persons who entered the room 402 coincides with the number of persons who exited the room 402 (YES in step S1202), the processing proceeds to step S1203.

In step S1203, the determination unit 302 determines whether all of the persons who exited the room 402 are unregistered persons. In a case where all of the persons are determined to be unregistered persons (YES in step S1203), the processing proceeds to step S1204. In step S1204, the determination unit 302 acquires the entry record from the recording unit 305 and corrects the exit record as required. On the other hand, in a case where at least one person is determined to be a registered person (NO in step S1203), the exit record does not need to be corrected. Then, the processing exits this flowchart.

The correction method in step S1204 will be described in detail below with reference to Table 1002.

Referring to Table 1002, if the determination result for the exit video image is an unregistered person, the determination unit 302 first references the entry record. If a person who actually passed is a registered person, information about the registered person is recorded in the latest entry record. The determination unit 302 determines the person who exited the room 402 to be a registered person and corrects the exit record to information about the registered person at the entry into the room 402. On the other hand, if the person who actually passed is an unregistered person, the latest entry record is also recorded as an unregistered person. Therefore, in such a case, the exit record does not need to be corrected. In this case, a notification is issued from the notification apparatus 405 and is not deactivated.

A case where the person who actually passed is a combination of a registered person and an unregistered person will be described below. In a case where the determination result for the exit video image is an unregistered person for the two persons, the determination unit 302 confirms past information for the two persons in the latest entry record. Then, the determination unit 302 acquires information about the registered person in the entry record and corrects the exit record based on the information. At this timing, the determination unit 302 corrects the exit record with the earlier detection time in time series. Alternatively, the determination unit 302 may compare the face images of the two persons acquired in the exit video image with the registered face image of the registered person, and change information about the person having higher similarity of the facial feature quantities. Like the case of entry, in a case where the registered person follows the unregistered person for reasons of facility operations, the determination unit 302 may correct information about the person with the later detection time. Alternatively, the image of the registered person acquired in the entry video image may be subjected to the comparison with the face images for the two persons acquired in the exit video image.

The present exemplary embodiment has been described above centering on a case where up to two persons enter the room 402 at the same time. A case where one registered person and two or more unregistered persons enter or exit the room 402 can be implemented by performing similar processing to that according to the present exemplary embodiment. For reasons of facility operations, a main use case is as described above.

According to the present exemplary embodiment, as described above, the entry or the exit record is corrected, making it possible to record more accurate information.

A third exemplary embodiment will be described below. The first exemplary embodiment has been described above centering on an example where the entry and the exit records are recorded to enable the entry/exit management even for locations where the entrance and exit cannot be locked for reasons of facility operations. However, at the time of emergency, such as a fire hazard and the incidence of a person to be aided in the room 402, a plurality of unregistered persons alone may enter the room 402. It is troublesome at the time of emergency to perform the notification deactivation processing, such as alarm cancellation, each time an unregistered person enters the room 402. In addition, it is appropriate at the time of emergency to record the entry and the exit records in a different format. In contrast to the examples according to the first and the second exemplary embodiments, processing for recording the entry and the exit records at the time of emergency, such as a fire hazard and the incidence of a person to be aided in the room 402 as a special event, will be described below with reference to FIGS. 13 and 14. The basic configuration of the image analysis system according to the present exemplary embodiment and the hardware configuration and the functional configuration of the information processing apparatus 100 are similar to those in FIGS. 1, 2, and 3, respectively, and thus redundant descriptions thereof will be omitted. Differences from the first exemplary embodiment will be described below.

Figure 13:
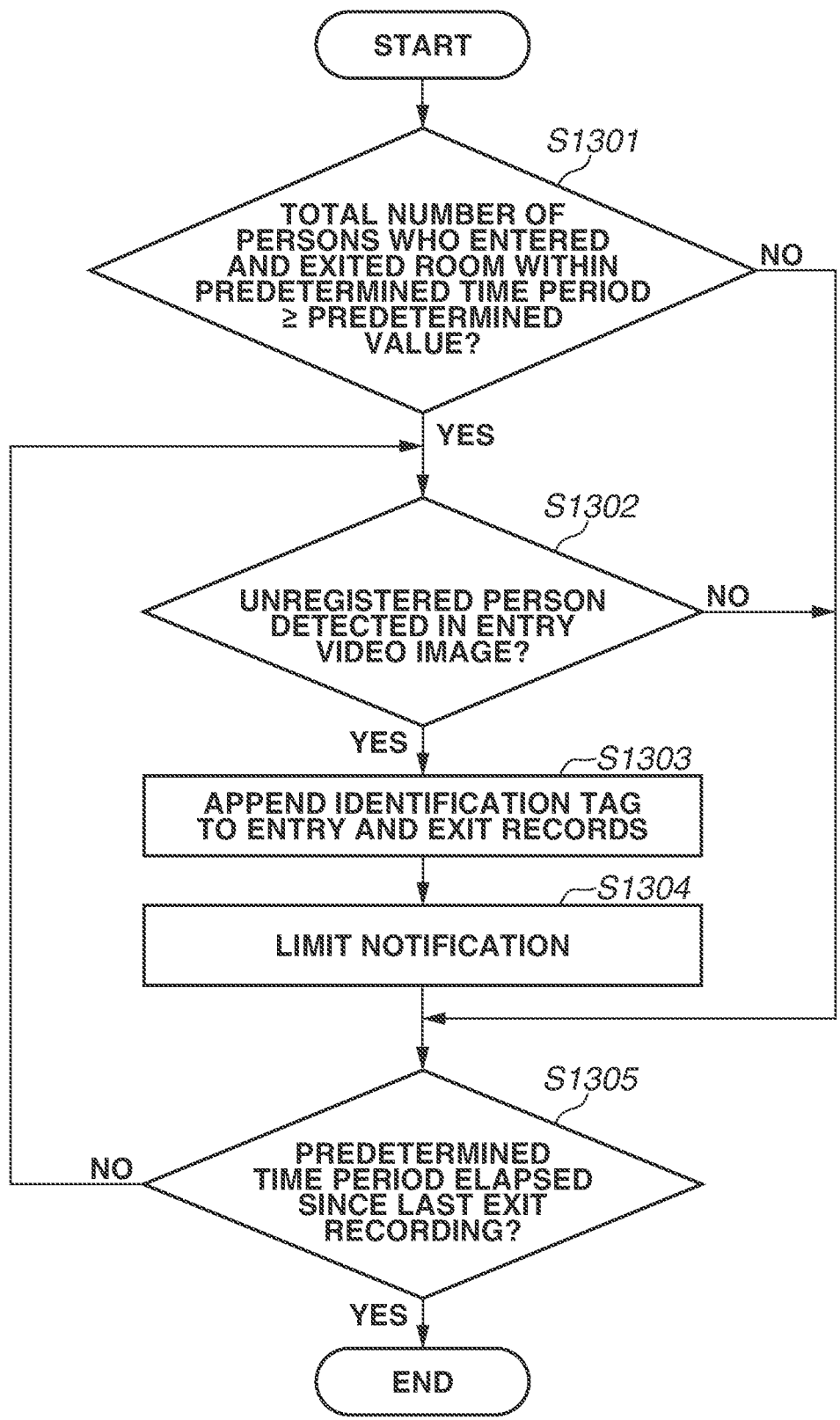
FIG. 13 is a flowchart illustrating an example of processing for recording the entry and the exit records at the time of emergency.

FIG. 13 is a flowchart illustrating an example of processing for recording the entry and the exit records at the time of emergency according to the present exemplary embodiment. The processing in FIG. 13 may be started upon detection of an emergency situation, such as a fire hazard and the incidence of a person to be aided in the room 402. Alternatively, the user may arbitrarily determine to start the processing.

The information processing apparatus 100 can implement each piece of the processing illustrated in FIG. 13 when the CPU 101 loads and executes a necessary program. FIG. 14 illustrates an example of a user interface (UI) for the entry and the exit records at the time of emergency displayed on the display unit 108. A record list 1400 describes an entry or exit record 1401 and a tag 1402 indicating the entry and exit at the time of emergency. The record list 1400 in FIG. 14 is generated by the determination unit 302 based on the entry and the exit records recorded in the recording unit 305 and displayed on the display unit 108.

Referring to FIG. 13, in step S1301, the determination unit 302 references the entry and the exit records recorded in the recording unit 305 to determine whether the total number of persons who entered and exited the room 402 within the predetermined time period is equal to or greater than the predetermined value. For example, for a facility where a group of two persons enters and exits a room for reasons of facility operations, the predetermined value may be set to 4. Alternatively, the predetermined value may be set for the total number of persons who entered the room 402 at the time of entry. For a facility where a group of two persons enters and exits a room for reasons of facility operations, the predetermined value may be set to 3. In a case where the total number of persons who entered and exited the room 402 within the predetermined time is equal to or greater than the predetermined value (YES in step S1301), the processing proceeds to step S1302. On the other hand, in a case where the total number of persons who entered and exited the room 402 within the predetermined time is less than the predetermined value (NO in step S1301), the processing proceeds to step S1305.

In step S1302, the determination unit 302 determines whether an unregistered person is detected in the entry video image in a state where the total number of persons who entered and exited the room 402 within the predetermined time is equal or greater than the predetermined value. In a case where an unregistered person is detected in the entry video image (YES in step S1302), the processing proceeds to step S1303. On the other hand, in a case where no unregistered person is detected in the entry video image (NO in step S1302), the processing proceeds to step S1305.

In step S1303, the determination unit 302 causes the display unit 108 to display the entry and the exit records at the time of emergency so that the identification tag 1402 is appended to the entry and the exit records of the relevant unregistered person. At this time, a specific symbol as illustrated in the identification tag 1402 in FIG. 14, an icon, or a message may be displayed, or the color may be changed. The method for implementing the identification tag 1402 does not matter as long as a special event can be identified. The identification tag 1402 may be appended at a timing when the total number of persons who entered and exited the room 402 reaches or exceeds the predetermined value in step S1301, or may be appended to the entry and the exit histories on a retroactive basis. Referring to the example of the record list 1400 in FIG. 14, the total number of persons who entered and exited the room 402 within the predetermined time (e.g., 5 minutes) becomes equal to or greater than the predetermined value (5 persons in this case) at 11:08:30 a.m., the identification tag 1402 is appended to the last five records. Although the identification tag 1402 is appended only to an unregistered person in this case, the identification tag 1402 may also be appended to a registered person. The identification tag 1402 may be appended to a registered person even when only a registered person is detected (NO in step S1302).

In step S1304, the notification unit 304 limits the notification in this processing. For example, in a case where the notification apparatus 405 issues a notification by using a speaker and a warning light, the notification apparatus 405 may turn ON the warning light but may not issue a voice notification. Alternatively, in a case where the notification apparatus 405 issues a push notification to a smartphone, the notification apparatus 405 subsequently issues no notification when a notification has been once issued. Even when an unregistered person is detected, the notification apparatus 405 maintains the notification deactivation if the unregistered person is accompanied by a registered person and the notification deactivation processing is performed as described above. However, when an unregistered person alone subsequently enters the room 402, the notification apparatus 405 limits the notification. According to the present exemplary embodiment, there are many cases where an unregistered person alone enters the room 402, as in the example illustrated in FIG. 14. In such a case, limiting the notification enables reducing the complication at the time of emergency.

In step S1305, the determination unit 302 determines whether a predetermined time period has elapsed since the last exit recording. In a case where the predetermined time period has elapsed (YES in step S1305), the determination unit 302 determines that entry and exit at the time of emergency are completed. Then, the processing exits this flowchart. On the other hand, in a case where the predetermined time period has not elapsed (NO in step S1305), the processing returns to step S1302. The determination unit 302 may record in the recording unit 305 video images of the camera for capturing the entries and exits since a predetermined time period before the time when the total number of persons who entered and exited the room 402 within the predetermined time period is determined to be equal to or greater than the predetermined value in step S1301 till the predetermined time period has elapsed since the latest exit in the processing in step S1305.

As described above, the present exemplary embodiment limits the notification at the time of emergency to enable eliminating the complication of the notification when many unregistered persons, such as ambulance crews, enter the room 402.

A fourth exemplary embodiment will be described below centering on a method for limiting the notification according to the combination of persons detected within a predetermined time period for the notification operation upon detection of an unregistered person, with reference to the above-described first or second exemplary embodiment. According to the present exemplary embodiment, even when an unregistered person is detected in the entry video image, the determination unit 302 issues no notification if the unregistered person is determined to have entered the room 402 together with a registered person. A method for determining whether an unregistered person entered the room 402 together with a registered person will be described below with reference to FIG. 15. The basic configuration of the image analysis system according to the present exemplary embodiment and the hardware configuration and the functional configuration of the information processing apparatus 100 are similar to those in FIGS. 1, 2, and 3, respectively, and thus redundant descriptions thereof will be omitted. Differences from the first exemplary embodiment will be described below.

According to the present exemplary embodiment, the determination unit 302 identifies the same person between a plurality of frames based on the procedure illustrated in FIG. 5. FIG. 15 illustrates an example of a matching result list 1500 for each frame when a registered person (registrant) and an unregistered person (non-registrant) entered the room 402 together. "Frame No." in the title of the matching result list 1500 indicates a transition index for the matching result for each time series. A smaller number indicates earlier data in time series, and a larger number indicates later data in time series. Each of Id (1 to 4) indicates the same person. The column "Id=1" indicates the transition of the matching result of a specific person.

For example, the determination unit 302 compares the matching result list (Id=1), i.e., a matching result list 1501 of a registered person A (registrant A) with the matching result list (Id=2), i.e., a matching result list 1502 of an unregistered person. In this case, in Frame Nos. 4 to 11, the registered person A (Id=1) and the unregistered person (Id=2) are detected at the same time. In a case where the two persons are continuously detected at the same time in a plurality of frames (the number of frames is equal to or greater than a predetermined value), the determination unit 302 determines that the unregistered person entered the room 402 together with the registered person. The number of frames in which the two persons are continuously detected at the same time may be an arbitrary number equal to or greater than 1, and may be adjusted according to the installation position of the camera.

On the other hand, the matching result list (Id=3), i.e., a matching result list 1503 of a registered person B (registrant B) and the matching result list (Id=4), i.e., a matching result list 1504 of an unregistered person are at close positions in time series. However, there are no frames in which the two persons are detected at the same time. In this case, the determination unit 302 determines that the unregistered person (Id=4) did not enter the room 402 together with the registered person B (Id=3). According to the present exemplary embodiment, a condition for determining that the two persons entered the room 402 at the same time is simultaneous detection of two persons over a plurality of frames. However, the determination unit 302 may determine that the two persons entered the room 402 at the same time if the number of frames in the interval between frame groups in which the registered person and the unregistered person are detected is within a predetermined value. The number of frames in the interval between the matching result lists 1503 and 1504 is 2. However, the determination unit 302 may determine that the two persons entered the room 402 at the same time if the number of frames in the interval between frame groups in which the two persons are detected may be, for example, 5 or less. In this case, the determination unit 302 determines that the unregistered person (Id=4) entered the room 402 together with the registered person B (Id=3).

According to the present exemplary embodiment, as described with reference to FIG. 15, in a case where it is to determine that a registered person and an unregistered person entered the room 402 at the same time, the notification unit 304 does not perform the notification processing. More specifically, prior to the processing in step S705 in FIG. 7, the determination unit 302 references the matching result list of the person detected in the entry video image to determine whether the above-described condition is satisfied. If the above-described condition is satisfied, the processing exits the flowchart. On the other hand, if the above-described condition is not satisfied, the processing proceeds to step S705. In step S705, the determination unit 302 performs the notification processing. The notification unit 304 performs the notification processing only when a registered person and an unregistered person did not enter the room 402 at the same time. Although the present exemplary embodiment has been described above centering on a method for determining whether two persons entered the room 402 at the same time, the determination unit 302 can determine whether three or more persons entered the room 402 at the same time, based on a similar method.

According to the present exemplary embodiment as described above, in a case where a registered person and an unregistered person enter the room 402 together, the notification itself is not issued and therefore the notification deactivation processing is not required.

A fifth exemplary embodiment will be described below centering on an example where registered persons are grouped, and the notification is limited when a registered person belonging to a specific group and an unregistered person, or registered persons enter the room 402 at the same time. Details will be described below with reference to FIG. 16. The basic configuration of the image analysis system according to the present exemplary embodiment and the hardware configuration and the functional configuration of the information processing apparatus 100 are similar to those in FIGS. 1, 2, and 3, respectively, and thus redundant descriptions thereof will be omitted. Differences from the first exemplary embodiment will be described below.

Figure 16:
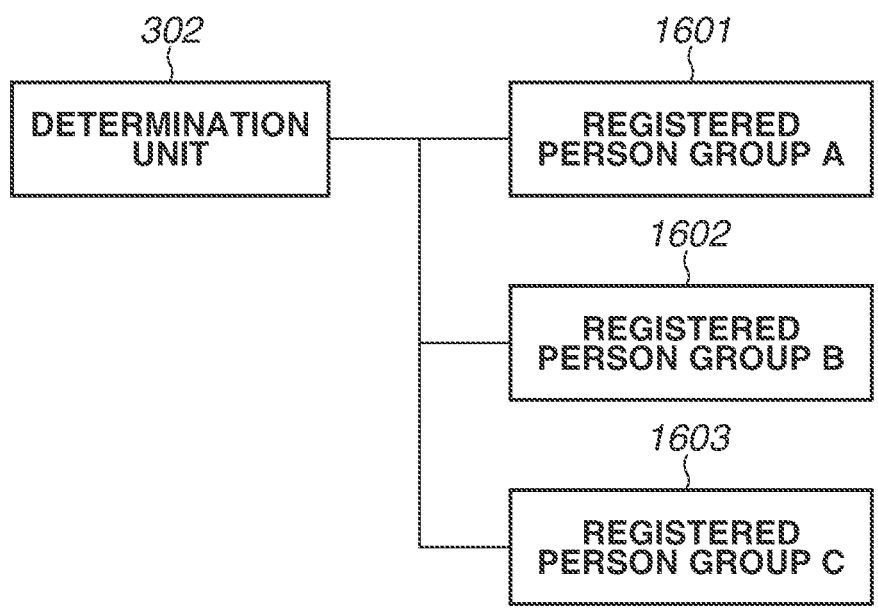
FIG. 16 illustrates a list referenced by a determination unit according to a fifth exemplary embodiment.

FIG. 16 illustrates a list referenced by the determination unit 302 in FIG. 3. The determination unit 302 references a registered person list including registrant groups (registered-person groups) to determine a registered person and an unregistered person. Referring to the example illustrated in FIG. 16, the determination unit 302 references three different registrant groups A1601, B1602, and C1603. The registered person list including the registrant groups A1601, B1602, and C1603 may be configured to be stored by the determination unit 302, and acquired from the storage device 109 via the network 111. The format of the registered person list does not matter.

The notification operation performed when a registered person belonging to a specific group and an unregistered person, or registered persons enter the room 402 at the same time will be described below with reference to FIG. 17.

In an example 1700 illustrated in FIG. 17, a registered person belonging to group A is permitted to enter and exit the room 402 alone. The registered person belonging to group A can enter the room 402 together with an unregistered person and a registered person belonging to group B. The registered person belonging to group A is recognized as a registered person who satisfies the notification deactivating condition with the procedure illustrated in FIG. 8. On the other hand, the registered person belonging to group B is permitted to enter the room 402 only in a case where the registered person belonging to group B enters the room 402 together with the registered person belonging to group A. The registered person belonging to B is not recognized as a registered person who satisfies the notification deactivating condition with the procedure illustrated in FIG. 8. A registered person belonging to group C can enter the room 402 alone, but cannot enter the room 402 together with a third person including an unregistered person. The registered person belonging to group C is not recognized as a registered person who satisfies the notification deactivating condition with the procedure illustrated in FIG. 8.

In a case where entry conditions as illustrated in FIG. 17 are presented to the registrant groups A1601, B1602, and C1603, the notification apparatus 405 does not issue a notification for a permitted combination but issues a notification for an unpermitted combination. For example, in a case where a registered person belonging to group A and an unregistered person attempt to enter the room 402 at the same time, the notification apparatus 405 does not issue a notification. On the other hand, in a case where a registered person belonging to group C and a registered person belonging to group B attempt to enter the room 402 at the same time, the notification apparatus 405 issues a notification even when no unregistered person exists. More specifically, instead of determining whether an unregistered person exists in the processing in step S703 in FIG. 7, the determination unit 302 determines whether, for example, a permission condition as illustrated in FIG. 17 is satisfied. When the permission condition is satisfied, the processing exits the flowchart. When the permission condition is not satisfied, the processing proceeds to step S704.

At this time, the notification contents may be changed according to the combination of groups. For example, in a case where a registered person belonging to group C and a registered person belonging to group B attempt to enter the room 402, the notification apparatus 405 turns ON the warning light. In a case where a registered person belonging to group C and an unregistered person attempt to enter the room 402, the notification apparatus 405 may generate a sound from the speaker. Such a setting is useful, for example, when registering a guiding staff to group A and a customer to group B, and managing the entry into a room that is not permitted to be used by customers alone. The setting also enables such an operation that registers a machine maintenance vendor to group C and permits the vendor to enter the room 402 alone for the purpose of machine maintenance. A registered person recognized as a registered person who satisfies the notification deactivating condition with the procedure illustrated in FIG. 8 but not permitted to enter the room 402 alone or together with another person may be separately grouped. Further, in this grouping, the time zone and period may be specified at the same time.

As described above, the present exemplary embodiment enables increasing the number of variations of entry permission conditions, making it possible to issue and deactivate a notification in more certain cases.

The first exemplary embodiment acquires the video image for deactivating notification separately from entry and exit video images, and, upon detection of a registered person in the video image for deactivating notification, deactivates the notification. A sixth exemplary embodiment will be described below centering on an image analysis system that determines a registered person or an unregistered person based on the entry and the exit video images, records entry and exit results, and upon detection of a registered person in the entry video image after detecting an unregistered person in the entry video image, deactivates a notification. Processing according to the sixth exemplary embodiment will be described in detail below with reference to FIGS. 18 to 20.

The hardware configuration of the information processing apparatus and the basic configuration of the image analysis system according to the present exemplary embodiment are similar to those illustrated in FIGS. 1 and 2, respectively, and thus redundant descriptions thereof will be omitted. Differences from the first exemplary embodiment will be described below.

Figure 18:
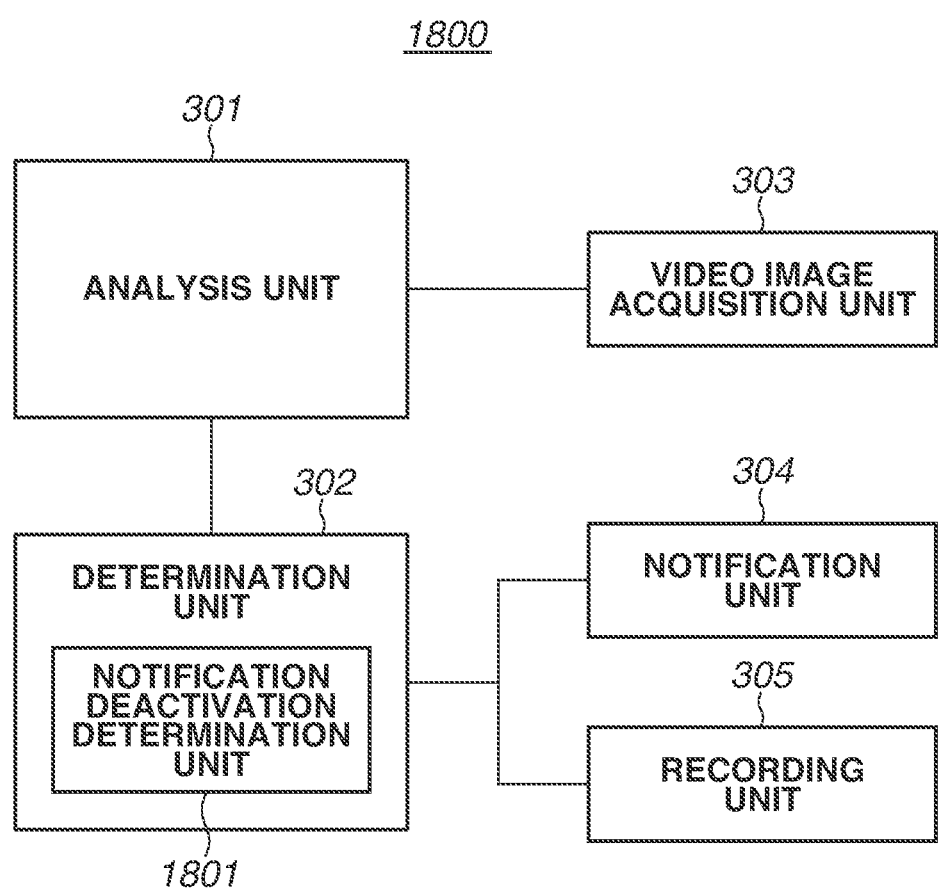
FIG. 18 is a block diagram illustrating an example of a functional configuration of an information processing apparatus according to a sixth exemplary embodiment.

FIG. 18 is a block diagram illustrating an example of a functional configuration of an information processing apparatus 1800 according to the present exemplary embodiment. The determination unit 302 in FIG. 18 has a similar function to that in FIG. 3, but further includes a notification deactivation determination unit 1801 that performs processing according to the present exemplary embodiment. The function of the notification deactivation determination unit 1801 will be described in detail below.

Figure 19:
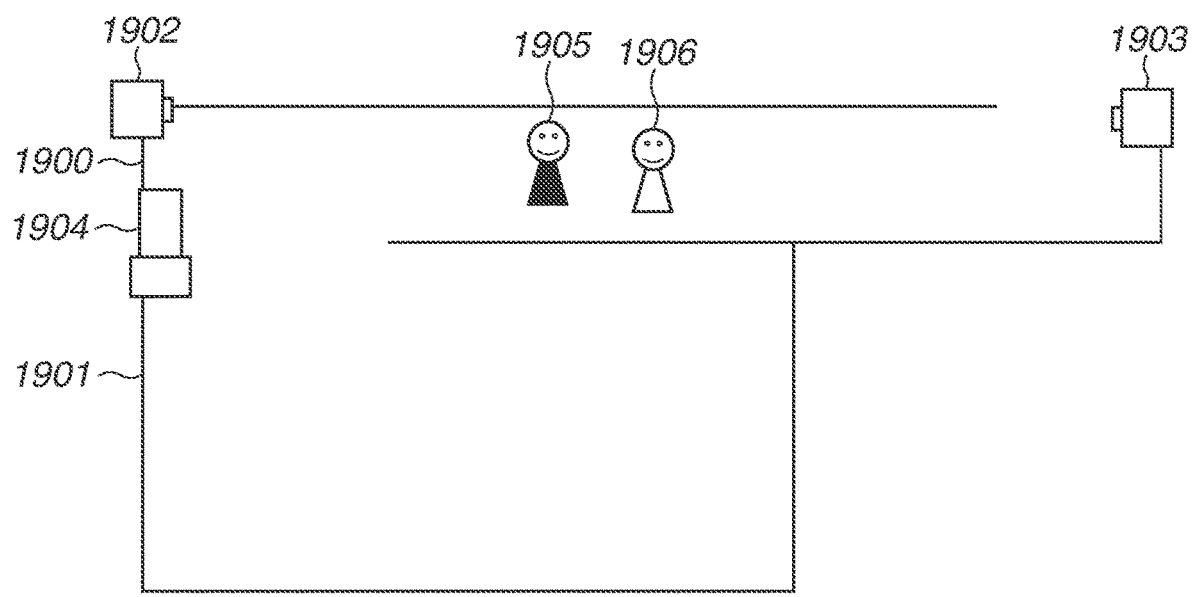
FIG. 19 illustrates an environment where an image of entry of a registered person and an unregistered person is captured.

FIG. 19 illustrates an environment where the entry of a registered person and an unregistered person is captured in a facility subject to the entry/exit management according to the present exemplary embodiment. Referring to the example in FIG. 19, the third camera for acquiring the video image for deactivating notification is not installed compared to the configuration in FIG. 4. The example in FIG. 19 includes a passage 1900 and a room 1901, where video images of the passage 1900 are captured by using an entry camera 1902 and an exit camera 1903. A notification apparatus 1904 that issues a notification upon detection of a person is installed in the vicinity of the entrance of the room 1901. Persons A1905 and B1906 are passing through the passage 1900.

Figure 20:
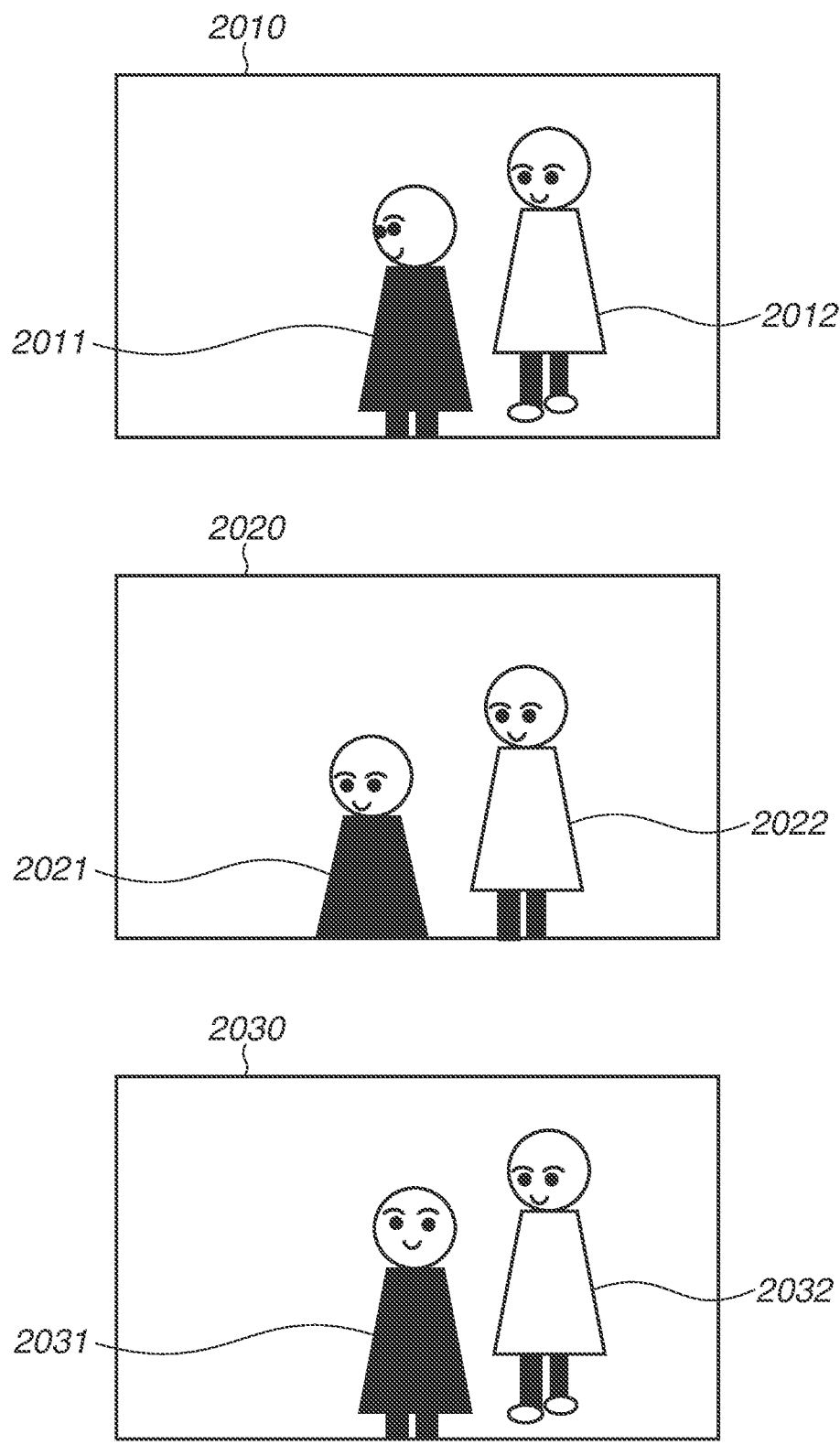
FIG. 20 illustrates an example of a video image of entry of a registered person and an unregistered person.

FIG. 20 illustrates an example of a video image including the persons A1905 and B1906 passing through the passage 1900 captured by the entry camera 1902. In this case, the persons A2011, A2021, and A2031 in FIG. 20 are the same person who is a registered person. On the other hand, persons B2012, B2022, and B2032 are the same person who is an unregistered person. A video image 2020 is a video image in a frame after a video image 2010 in time series.

At the timing of the video image 2010, the person A2011 as a registered person is walking while browsing the material at hand. Therefore, facial feature quantities are acquired at a lateral angle. Accordingly, the person A2011 is determined to be an unregistered person at the timing of the video image 2010, and only an unregistered person is detected in the entry video image. Accordingly, the notification unit 304 instructs the notification apparatus 1904 to issue a notification.

Then, at the timing of the video image 2020, more accurate facial feature quantities are acquired since the person A2021 turns the face in the moving direction in the passage 1900. Thus, the person A2021 is determined to be a registered person. Based on the determination that the persons A2011 and A2021 are the same person and that the determination result has changed from an unregistered person to a registered person, the notification deactivation determination unit 1801 issues a notification deactivation instruction to the notification unit 304. More specifically, the notification unit 304 deactivates notification according to the procedure illustrated in FIG. 8. In step S804, the determination unit 302 performs the determination based on the entry video image instead of the video image for deactivating notification. This processing can be performed at the same time even in a state where the third camera for acquiring the video image for deactivating notification exists, as illustrated in FIG. 4. At this time, the determination unit 302 may record the determination result of the person A2021 as a notification deactivation record.

As illustrated in a video image 2030, when the person A2031 as a registered person takes a specific operation, the notification deactivation determination unit 1801 may instruct the notification unit 304 to perform the notification deactivation processing. The video image 2030 is a frame later than the video image 2010 in time series. At the timing of the video image 2010, the person A2011 is detected as an unregistered person although the person is actually a registered person. At this time, the notification unit 304 instructs the notification apparatus 1904 to issue a notification by the processing of the determination unit 302. At the timing of the video image 2030, the face of the person A2031 faces the entry camera 1902. The analysis unit 301 detects a person in the entry video image and further detects a facial organ from the face of the person. The determination unit 302 determines the eye line based on the eye positions in the facial organ detection. In a case where the eye line faces the entry camera 1902, the notification deactivation determination unit 1801 deactivates notification.

As described above, according to the present exemplary embodiment, the notification deactivation determination unit 1801 deactivates notification when a registered person is confirmed in the entry video image without using the camera image for capturing the video image for deactivating notification, or when a registered person is confirmed and the eye line faces the camera. This eliminates the need of the camera for capturing the video image for deactivating notification, enabling the entry/exit management with a simpler system.

According to the above-described exemplary embodiment, even after the detection of a registered person and execution of the notification deactivation, if an unregistered person continues to be captured in the entry video image of the entry camera and therefore an unregistered person is detected, the notification apparatus 405 issues a notification again. A seventh exemplary embodiment will be described below centering on an example where, in contrast to the first to the sixth exemplary embodiments, the notification apparatus 405 does not issue a notification again for a predetermined time period after a notification has been once deactivated. This processing is particularly useful in a system that issues a notification upon detection of an unregistered person in the configuration according to the sixth exemplary embodiment. For example, there is a case where notification is deactivated with the procedure according to the sixth exemplary embodiment and then a notification is issued again upon detection of an unregistered person in the entry video image of the entry camera. The present exemplary embodiment enables avoiding the issuance of such a second notification. The method for preventing re-notification according to the present exemplary embodiment is not limited to the application in the sixth exemplary embodiment and may be combined with the first to the fifth exemplary embodiments. The hardware configuration of the information processing apparatus and the basic configuration of the image analysis system according to the present exemplary embodiment are similar to those illustrated in FIGS. 1 and 2, respectively, and thus redundant descriptions thereof will be omitted. Differences from the sixth exemplary embodiment will be described below.

Figure 21:
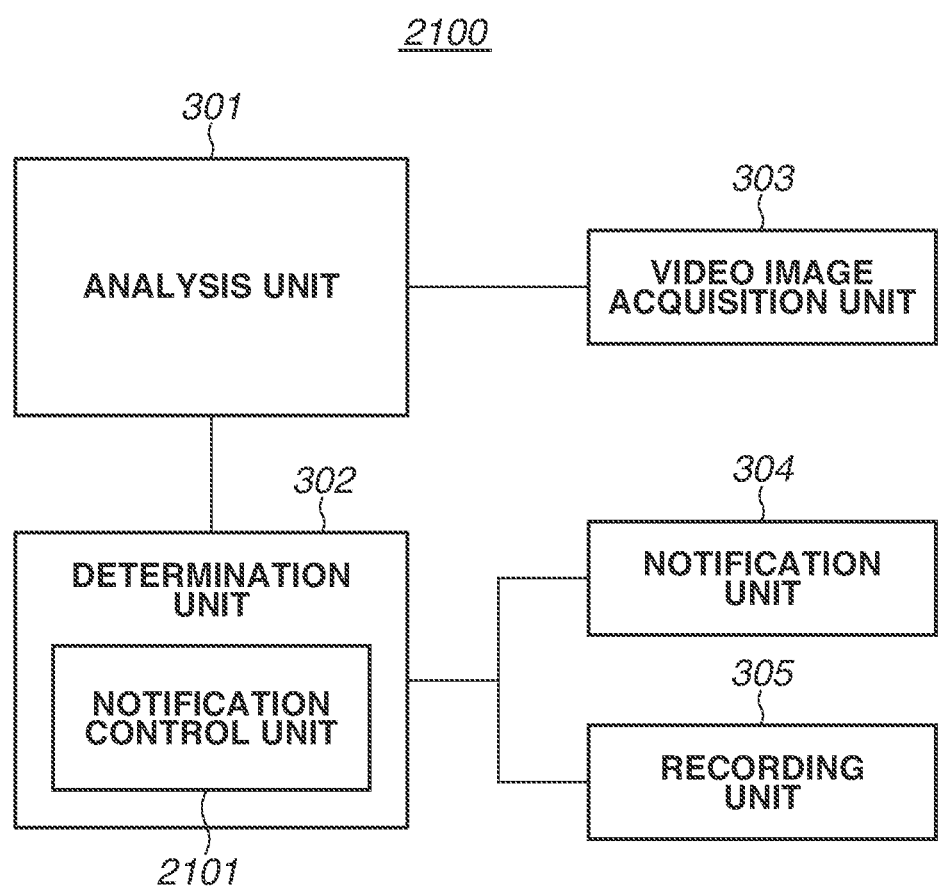
FIG. 21 is a block diagram illustrating an example of a functional configuration of an information processing apparatus according to a seventh exemplary embodiment.

Processing according to the present exemplary embodiment will be described below with reference to FIGS. 21 and 22. FIG. 21 is a block diagram illustrating an example of a functional configuration of an information processing apparatus 2100 according to the present exemplary embodiment. The determination unit 302 in FIG. 21 has a similar function to that in FIG. 3, but further includes a notification control unit 2101 that performs processing according to the present exemplary embodiment. The functional configuration will be described below based on the configuration illustrated in FIG. 21 to simplify the description. However, the notification control unit 2101 may be added to the configuration of the determination unit 302 illustrated in FIG. 18.

Figure 22:
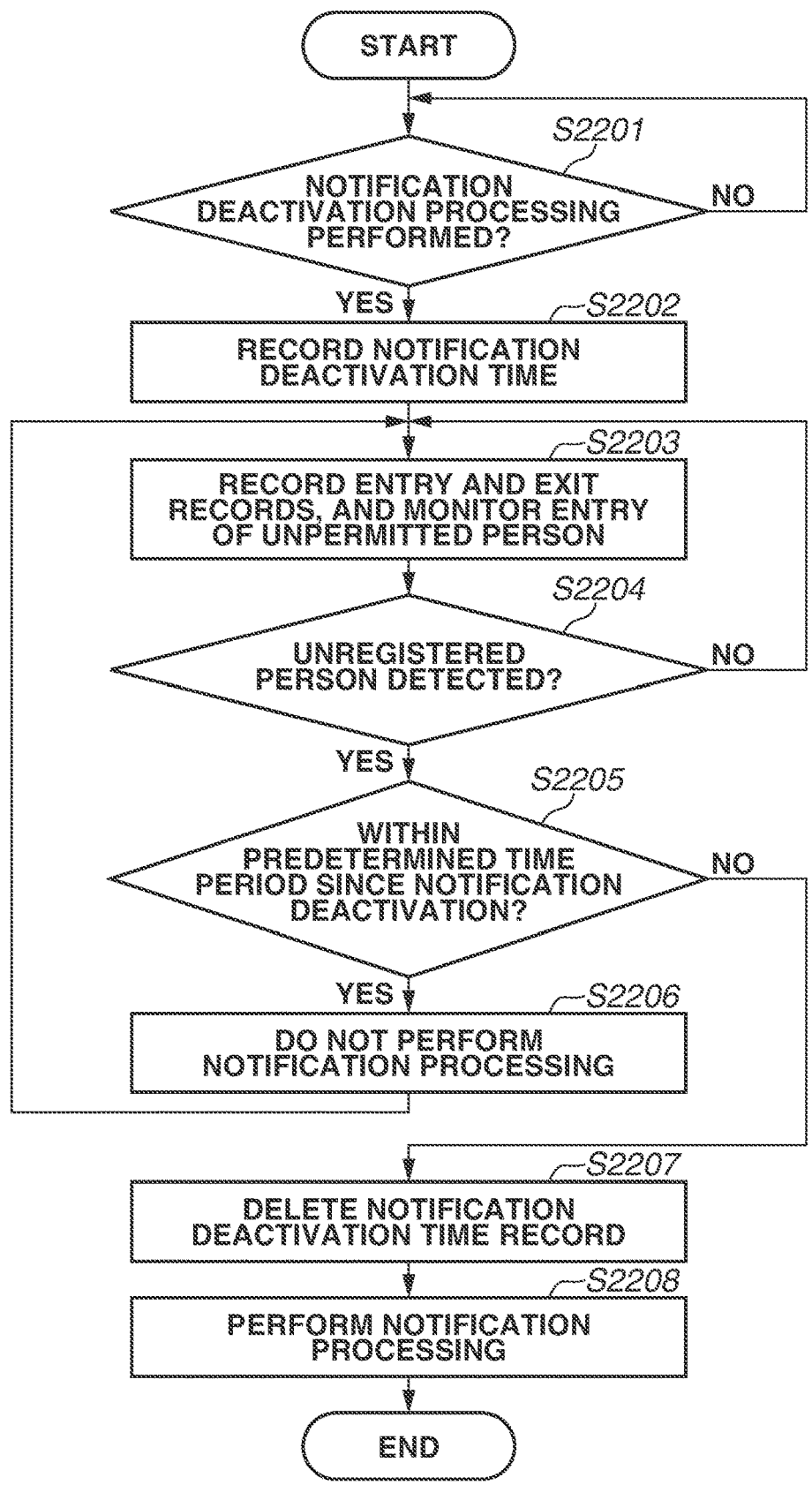
FIG. 22 is a flowchart illustrating an example of processing for preventing a notification from being issued for a predetermined time period after deactivating notification.

FIG. 22 is a flowchart illustrating an example of processing for deactivating the notification for a predetermined time period since the notification is deactivated. The processing in FIG. 22 is started in a state where a notification has been issued with the procedure according to the above-described exemplary embodiment. The information processing apparatus 2100 can implement the processing illustrated in FIG. 22 when the CPU 101 loads and executes a necessary program.

In step S2201, the determination unit 302 determines whether the notification deactivation processing is performed. In a case where prevention of re-notification according to the present exemplary embodiment is to be applied to the first to the fifth exemplary embodiments, the determination unit 302 determines whether a registered person is detected in the video image for deactivating notification and the notification deactivation processing is performed. This also applies to a case where a registered person operates the notification apparatus 405 to deactivate notification. In a case where the notification deactivation processing is not performed (NO in step S2201), the CPU 101 waits until the notification deactivation processing is performed. If all of the persons who have entered the room 402 exits the room 402 during execution of this processing loop, the CPU 101 stops the repetition processing in step S2201. On the other hand, in a case where the notification deactivation processing is performed (YES in step S2201), the processing proceeds to step S2202.

In step S2202, the notification control unit 2101 records the notification deactivation time and maintains the information.

In step S2203, the analysis unit 301 and the determination unit 302 perform the entry and the exit recording processing and entry monitoring processing for unpermitted persons. The processing in step S2203 is similar to the processing according to the above-described exemplary embodiments. More specifically, the processing in step S2203 determines a registered person or an unregistered person in the entry and the exit video images, records the entry and the exit records in the recording unit 305, and detects an unregistered person in the entry video image.

In step S2204, the determination unit 302 determines whether an unregistered person is detected in the entry video image. In a case where no unregistered person is detected (NO in step S2204), the processing returns to step S2203. In step S2203, the analysis unit 301 and the determination unit 302 continue the entry monitoring processing. On the other hand, in a case where an unregistered person is detected (YES in step S2204), the processing proceeds to step S2205.

In step S2205, the notification control unit 2101 determines whether the present time is within a predetermined time period since the notification deactivation time. The reference time for the determination is the notification deactivation time recorded in step S2202. In a case where the present time is within the predetermined time period since the notification deactivation time (YES in step S2205), the processing proceeds to step S2206. In step S2206, the notification control unit 2101 controls the notification unit 304 not to perform the notification processing. Then, the processing returns to processing in step S2203. In step S2203, the analysis unit 301 and the determination unit 302 continue the entry monitoring processing.

On the other hand, in a case where the present time exceeds the predetermined time period since the notification deactivation time (NO in step S2205), the processing proceeds to step S2207. In step S2207, the notification control unit 2101 deletes the information about the notification deactivation time recorded in step S2202.

In step S2208, the notification unit 304 performs the notification processing like in the above-described exemplary embodiments.

As described above, the present exemplary embodiment enables preventing notifications from being issued in succession in a short time due to capturing of an unregistered person after a notification has been once deactivated. This eliminates the complication of repetitive issuance of notifications.

An eighth exemplary embodiment will be described below centering on processing for permitting the entry of the unregistered person (without issuing a notification) for a predetermined time period after a notification has been once deactivated. The hardware configuration of the information processing apparatus and the basic configuration of the image analysis system according to the present exemplary embodiment are similar to those illustrated in FIGS. 1 and 2, respectively, and thus redundant descriptions thereof will be omitted. Differences from the sixth exemplary embodiment will be described below.

The processing according to the present exemplary embodiment is not limited to the application in the sixth exemplary embodiment and may be combined with the first to the fifth exemplary embodiments.

Figure 23:
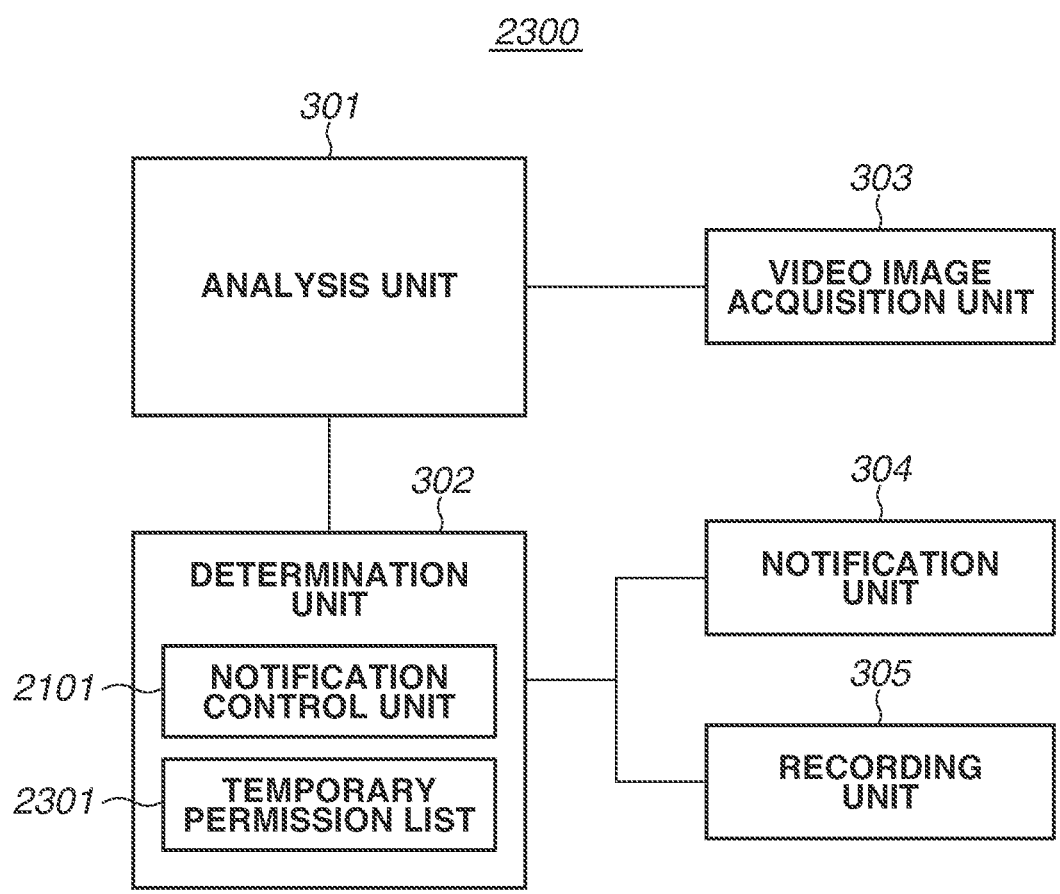
FIG. 23 is a block diagram illustrating an example of a functional configuration of an information processing apparatus according to an eighth exemplary embodiment.

Processing according to the present exemplary embodiment will be described below with reference to FIGS. 23 and 24. FIG. 23 is a block diagram illustrating an example of a functional configuration of an information processing apparatus 2300 according to the present exemplary embodiment. The determination unit 302 in FIG. 23 has a similar function to that in FIG. 21, but further includes a temporary permission list 2301 to perform the processing according to the present exemplary embodiment. The temporary permission list 2301 records the face images of persons (unregistered persons) to be temporarily permitted to enter the room 402 and information about the permission time. The temporary permission list 2301 may be provided as a function module separate from the determination unit 302. The format of the temporary permission list 2301 does not matter.

Figure 24:
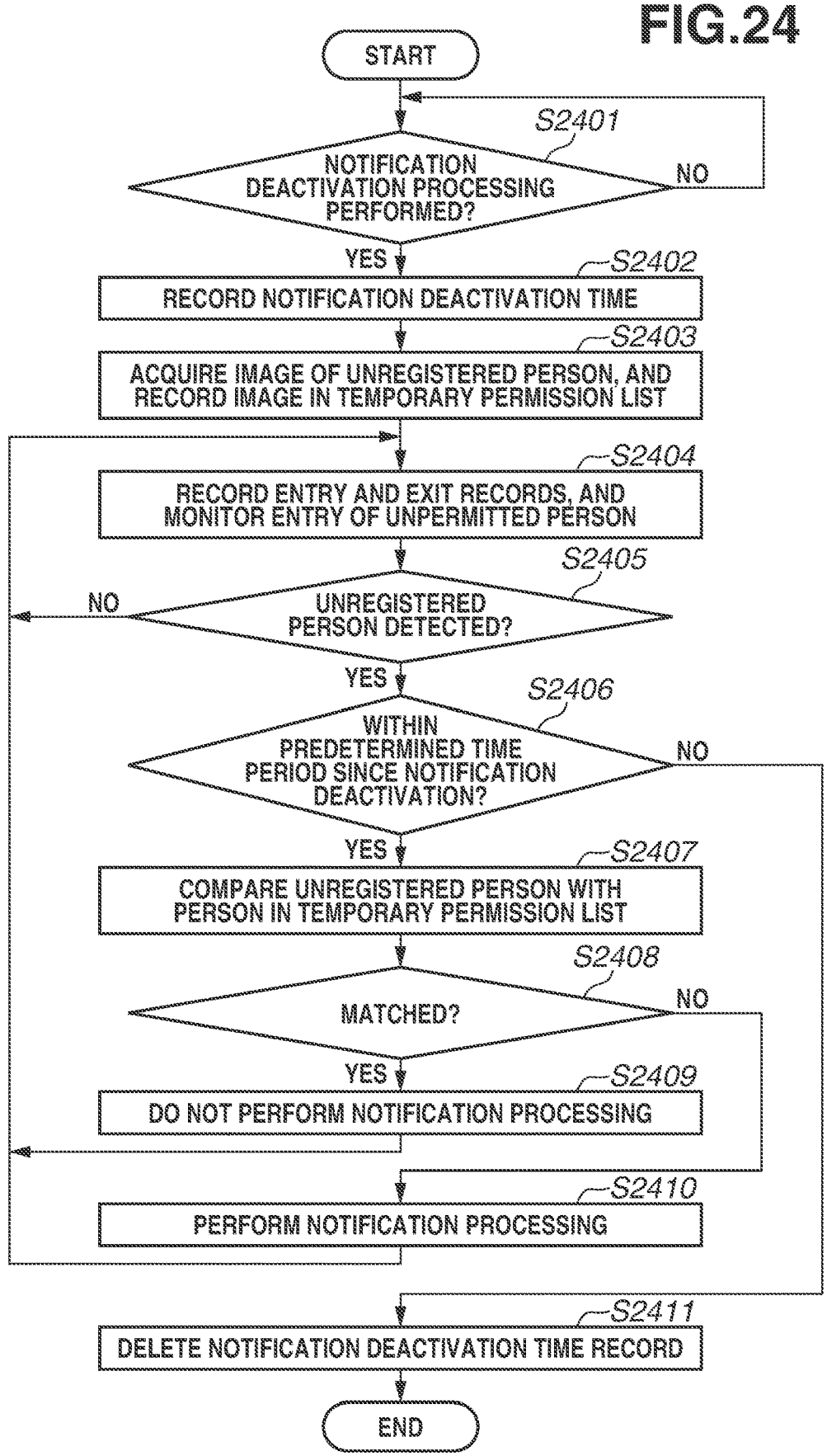
FIG. 24 is a flowchart illustrating an example of processing for permitting the entry of an unregistered person for a predetermined time period.

FIG. 24 is a flowchart illustrating an example of processing for permitting the entry of an unregistered person for a predetermined time period according to the present exemplary embodiment. The processing in FIG. 24 is started in a state where a notification has been issued with the procedure according to the above-described exemplary embodiments. The information processing apparatus 2300 can implement the processing illustrated in FIG. 24 when the CPU 101 loads and executes a necessary program.

Processing in steps S2401 and S2402 is similar to the processing in steps S2201 and S2202 in FIG. 22, respectively, and redundant descriptions thereof will be omitted.

In step S2403, the determination unit 302 acquires the face image of an unregistered person detected together with a registered person in step S2401. Then, the determination unit 302 registers the acquired face image of the unregistered person to the temporary permission list 2301. The face image to be recorded may be the face image having the largest face size or a plurality of face images at different facial angles. In addition, the face image may be registered in the temporary permission list 2301 in association with the notification deactivation time recorded in step S2402.

Processing in steps S2404 to S2406 is similar to the processing in steps S2203 to S2205 in FIG. 22, respectively, and redundant descriptions thereof will be omitted.

In step S2407, the determination unit 302 references the temporary permission list 2301 to compare the unregistered person detected in step S2405 with a person registered in the temporary permission list 2301. In step S2408, the determination unit 302 determines whether the unregistered person matches a person in the list. In a case where the unregistered person matches a person in the list (YES in step S2408), the processing proceeds to step S2409. In step S2409, the notification control unit 2101 controls the notification unit 304 not to perform the notification processing. Then, the processing returns to step S2404.

On the other hand, in a case where the unregistered person does not coincide with a person in the list (NO in step S2408), the processing proceeds to step S2410. In step S2410, the notification apparatus 405 performs the notification processing. Then, the processing returns to step S2404.

In a case where the present time exceeds the predetermined time period since the notification deactivation time (NO in step S2406), the processing proceeds to step S2411. In step S2411, the notification control unit 2101 deletes the record of the notification deactivation time. Then, the processing exits this flowchart.

When an unregistered person registered in the temporary permission list 2301 is detected again, the present exemplary embodiment enables preventing notifications from being issued in succession in a short time. This eliminates the complication of repetitive issuance of notifications.

Other Exemplary Embodiments

Some embodiments can also be achieved when a program for implementing at least one of the functions according to the above-described exemplary embodiments is supplied to a system or apparatus via a network or storage medium, and at least one processor in a computer of the system or apparatus reads and executes the program. Further, some embodiments can also be achieved by a circuit (for example, an application specific integrated circuit (ASIC)) for implementing at least one function.

The present disclosure makes it possible to manage the entry and exit of unregistered persons on a location where the entrance and exit cannot be locked.

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-107295, which was filed on Jun. 29, 2021 and which is hereby incorporated by reference herein in its entirety.

What is claimed is:

1. An information processing apparatus comprising:
one or more memories storing instructions; and
one or more processors executing the instructions to:
acquire a first video image capturing an entrance of a specific location and a second video image capturing inside of the specific location;
detect a first person included in the first video image and a second person included in the second video image;
determine whether each of the first person and the second person is a registered person or an unregistered person;
instruct a notification apparatus to issue a notification in a case where the first person included in the first video image is determined to be an unregistered person; and
instruct the notification apparatus to stop the notification in a case where the second person included in the second video image is determined to be a registered person;
generate an entry record of a person entering the specific location based on the first video image; and
modify the entry record based on the second video image in a case where the first person included in the first video image is determined not to be a registered person and the notification apparatus has stopped the notification.

2. The information processing apparatus according to claim 1, wherein the notification apparatus does not issue the notification in a case where a person who is a registered person and a person who is an unregistered person are detected in the first video image in a predetermined time period.

3. The information processing apparatus according to claim 1,
wherein each person who is a registered person belongs to one of a plurality of groups each having a different one of permission conditions for entering the specific location, and
wherein, in a case where the first video image includes a person who is a registered person belonging to a group not satisfying at least one of the permission conditions the notification apparatus issues the notification.

4. The information processing apparatus according to claim 1, wherein the notification apparatus does not issue the notification, in a case where the first video image includes a person who is an unregistered person within a predetermined time since the notification apparatus has stopped the notification.

5. The information processing apparatus according to claim 1,
wherein the instructions further cause the information processing apparatus to:
generate an exit record of a person from the specific location based on the first video image, and
modify the exit record based on the first video image, in a case where the first video image does not include a person who is a registered person exiting the specific location after the exit record is generated.

6. The information processing apparatus according to claim 1, wherein each of the first person and the second person is determined to be a registered person or an unregistered person on a basis of a comparison between a feature amount of a face of the first person and a feature amount of each registered person in a plurality of registered persons, and a comparison between a feature amount of a face of the second person and a feature amount of each registered person in the plurality of registered persons.

7. The information processing apparatus according to claim 1,
wherein an imaging apparatus which acquires the first video image is different from an imaging apparatus which acquires the second video image.

8. An information processing method comprising:
acquiring a first video image capturing an entrance of a specific location and a second video image capturing inside of the specific location;
detecting a first person included in the first video image and a second person included in the second video image;
determining whether each of the first person and the second person is a registered person or an unregistered person;
instructing a notification apparatus to issue a notification in a case where the first person included in the first video image is determined to be an unregistered person;
instructing the notification apparatus to stop the notification in a case where the second person included in the second video image is determined to be a registered person;
generating an entry record of a person entering the specific location based on the first video image; and
modifying the entry record based on the second video image in a case where the first person included in the first video image is determined not to be a registered person and the notification apparatus has stopped the notification.

9. A non-transitory storage medium storing a program for causing a computer to execute an information processing method, the information processing method comprising:
acquiring a first video image capturing an entrance of a specific location and a second video image capturing inside of the specific location;
detecting a first person included in the first video image and a second person included in the second video image;
determining whether each of the first person and the second person is a registered person or an unregistered person;
instructing a notification apparatus to issue a notification in a case where the first person included in the first video image is determined to be an unregistered person;
instructing the notification apparatus to stop the notification in a case where the second person included in the second video image is determined to be a registered person;
generating an entry record of a person entering the specific location based on the first video image; and
modifying the entry record based on the second video image in a case where the first person included in the first video image is determined not to be a registered person and the notification apparatus has stopped the notification.

* * * * *